United States Patent
Nakayama et al.

(10) Patent No.: US 10,961,135 B2
(45) Date of Patent: Mar. 30, 2021

(54) WATER TREATMENT APPARATUS AND WATER TREATMENT METHOD

(71) Applicant: Mitsubishi Electric Corporation, Chiyoda-ku (JP)

(72) Inventors: Yoshihiro Nakayama, Chiyoda-ku (JP); Tokiko Yamauchi, Chiyoda-ku (JP); Nozomu Yasunaga, Chiyoda-ku (JP); Seiji Noda, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/531,945

(22) Filed: Aug. 5, 2019

(65) Prior Publication Data

US 2019/0352201 A1 Nov. 21, 2019

Related U.S. Application Data

(63) Continuation of application No. 16/341,553, filed as application No. PCT/JP2017/027975 on Aug. 2, 2017.

(51) Int. Cl.
  *C02F 1/461* (2006.01)
  *C02F 1/46* (2006.01)
  (Continued)

(52) U.S. Cl.
  CPC .......... *C02F 1/46109* (2013.01); *B01D 35/16* (2013.01); *C02F 1/4608* (2013.01);
  (Continued)

(58) Field of Classification Search
  CPC .................................................. C02F 1/4691
  See application file for complete search history.

(56) References Cited

U.S. PATENT DOCUMENTS 3,879,225 A * 4/1975 Backhurst ........... C02F 1/46114
  429/122
5,538,611 A 7/1996 Otowa
  (Continued)

FOREIGN PATENT DOCUMENTS

JP  S49-032880 A  3/1974
JP  S53-079770 A  7/1978
  (Continued)

OTHER PUBLICATIONS

International Search Report dated Sep. 12, 2017 in PCT/JP2017/027975 filed Aug. 2, 2017.
(Continued)

*Primary Examiner* — Salil Jain
(74) *Attorney, Agent, or Firm* — Xsensus LLP

(57) ABSTRACT

A water treatment apparatus includes: a first granular electrode member and a second granular electrode member stored in a water treatment unit and provided so as to be separated from each other; a power supply unit which applies voltage between the first granular electrode member and the second granular electrode member so that ions contained in treatment target water supplied from one side of the water treatment unit are adsorbed to the first granular electrode member and the second granular electrode member; and a washing water supply pump which causes washing water to flow from the other side of the water treatment unit to the one side of the water treatment unit, thereby washing the first granular electrode member and the second granular electrode member, wherein the first granular electrode member and the second granular electrode member each include a plurality of flowable granular electrode members.

17 Claims, 18 Drawing Sheets

(51) Int. Cl.
  *C02F 1/48* (2006.01)
  *B01D 35/16* (2006.01)
(52) U.S. Cl.
  CPC ...... *C02F 1/48* (2013.01); *C02F 2001/46119* (2013.01); *C02F 2001/46161* (2013.01)

(56) References Cited

U.S. PATENT DOCUMENTS

| | | | |
|---|---|---|---|
| 5,837,124 A | | 11/1998 | Su et al. |
| 6,309,532 B1 | * | 10/2001 | Tran .................. B01J 47/08 |
| | | | 204/267 |
| 2008/0078673 A1 | * | 4/2008 | Elson ................ C02F 1/46114 |
| | | | 204/278.5 |
| 2009/0045074 A1 | | 2/2009 | Hoover et al. |
| 2009/0127119 A1 | | 5/2009 | Witte et al. |
| 2009/0308757 A1 | * | 12/2009 | Crettenand ............ C25C 7/002 |
| | | | 205/334 |
| 2010/0059378 A1 | | 3/2010 | Elson et al. |
| 2013/0056366 A1 | | 3/2013 | Elson et al. |
| 2013/0105324 A1 | * | 5/2013 | Averbeck ............ C02F 1/4691 |
| | | | 204/555 |
| 2016/0229717 A1 | * | 8/2016 | Servida ................. C25B 9/20 |
| 2018/0327288 A1 | * | 11/2018 | Yamauchi ............ C02F 1/4691 |
| 2019/0152811 A1 | * | 5/2019 | Cohen ................... H01M 4/02 |

FOREIGN PATENT DOCUMENTS

| | | | |
|---|---|---|---|
| JP | H06-007771 A | | 1/1994 |
| JP | 11-90428 A | | 4/1999 |
| JP | H11-319838 A | | 11/1999 |
| JP | 2001-38107 A | | 2/2001 |
| JP | 3302443 B2 | | 7/2002 |
| JP | 2002-336863 A | | 11/2002 |
| JP | 2002336863 A | * | 11/2002 |
| JP | 2008-525163 A | | 7/2008 |
| JP | 2009-190016 A | | 8/2009 |
| JP | 2010-505601 A | | 2/2010 |
| JP | 2010-533587 A | | 10/2010 |
| JP | 2012-86192 A | | 5/2012 |
| KR | 1998-033214 A | | 7/1998 |
| WO | WO 2017/122520 A1 | | 7/2017 |

OTHER PUBLICATIONS

Office Action dated Jun. 7, 2019 in Korean Patent Application No. 10-2019-7012108, 30 pages (with unedited computer generated English translation).

* cited by examiner

WATER TREATMENT APPARATUS AND WATER TREATMENT METHOD

CROSS-REFERENCE TO RELATED APPLICATIONS

This application is a continuation of and claims the benefit of priority from U.S. application Ser. No. 16/341,553, filed on Apr. 12, 2019, which is a National Stage Application of PCT/JP2017/027975, filed on Aug. 2, 2017, and claims the benefit of priority from the prior Japanese Patent Application No. 2016-214873, filed on Nov. 2, 2016; the entire contents of which are incorporated herein by reference.

TECHNICAL FIELD

The present invention relates to a water treatment apparatus and a water treatment method for treating treatment target water using an electrical double layer capacitor.

BACKGROUND ART

Electric desalination technology using an electrical double layer capacitor is technology of adsorbing and removing ions contained in treatment target water such as sea water or contaminated water using a Coulomb force, thereby desalinating the treatment target water. In one example of conventional electric desalination, an electrical double layer capacitor having a flat-plate shape is configured such that activated carbon layers mainly formed from activated carbon having a high specific surface area are provided on both sides of a separator formed from an electrically-insulating porous liquid-permeable sheet, collector electrodes are provided on the outer sides of the activated carbon layers, and holder plates are provided on the outer sides of the collector electrodes. Then, while a liquid containing an ionic substance is passed through the electrical double layer capacitor, application of DC low voltage to the collector electrodes and short-circuit or reverse connection between both collector electrodes are repeated alternately (see, for example, Patent Document 1).

As another example, in an electrical double layer capacitor for performing desalination, ozone is generated from treatment water before desalination, and treatment target water is sterilized by the ozone, thereby preventing generation of biofilm on the surfaces of electrodes, and the polarities of the electrodes are changed alternately during operation, thereby decomposing and dissolving biofilm and/or scale that has been already generated on the surfaces of the electrodes and thus removing the biofilm and/or scale (see, for example, Patent Document 2).

CITATION LIST

Patent Document

Patent Document 1: Japanese Patent No. 3302443
Patent Document 2: Japanese Laid-Open Patent Publication No. 2009-190016

SUMMARY OF THE INVENTION

Problems to be Solved by the Invention

However, merely alternately repeating application and short-circuit/reverse connection between both collector electrodes as in Patent Document 1 cannot prevent reduction in desalination efficiency due to biofilm or scale adhered to the surfaces of the electrodes while desalination is performed. In addition, performing only sterilization by ozone and alternate change of the polarities of the electrodes as in Patent Document 2 can remove biofilm and/or scale to a certain extent, but cannot remove biofilm and/or scale strongly adhered or fixed to the surfaces of the electrodes, and there is a possibility that such biofilm and/or scale remains on the surfaces of the electrodes.

The present invention has been made to solve the above problems, and an object of the present invention is to obtain a water treatment apparatus and a water treatment method that are capable of more reliably removing biofilm and/or scale adhered to the surfaces of electrodes.

Solution to the Problems

A water treatment apparatus according to the present invention includes: a first electrode and a second electrode stored in a water treatment unit and provided so as to be separated from each other by a separator which has an electric insulation property and allows a liquid to pass therethrough; a power supply unit which is connected to a pair of collectors provided at both ends of the water treatment unit and applies voltage between the first electrode and the second electrode via the pair of collectors so that ions contained in treatment target water supplied from one side of the water treatment unit via an inlet port are adsorbed to the first electrode and the second electrode, thereby performing desalination and generating desalinated water; and a washing water supply pump which causes washing water to flow from the other side of the water treatment unit to the one side of the water treatment unit, thereby washing the first electrode and the second electrode, wherein the first electrode and the second electrode each include a plurality of flowable granular electrode members, and the inlet port is provided with a flow-out preventing member for preventing the granular electrode members from flowing out from the water treatment unit.

Effect of the Invention

In the present invention, the first electrode and the second electrode for adsorbing and removing ions contained in treatment target water each include a plurality of flowable granular electrode members, and thus it is possible to further reliably remove biofilm and/or scale adhered to the surfaces of the electrodes.

DESCRIPTION OF EMBODIMENTS

Hereinafter, with reference to the accompanying drawings, embodiments of a water treatment apparatus and a water treatment method disclosed in the present application will be described in detail. It is noted that the embodiments shown below are merely examples and the present invention is not limited to these embodiments. It is noted that, hereinafter, "treatment target water" refers to raw water that has not undergone desalination yet, and "desalinated water" refers to treatment target water that has been desalinated.

Embodiment 1

Figure 1:
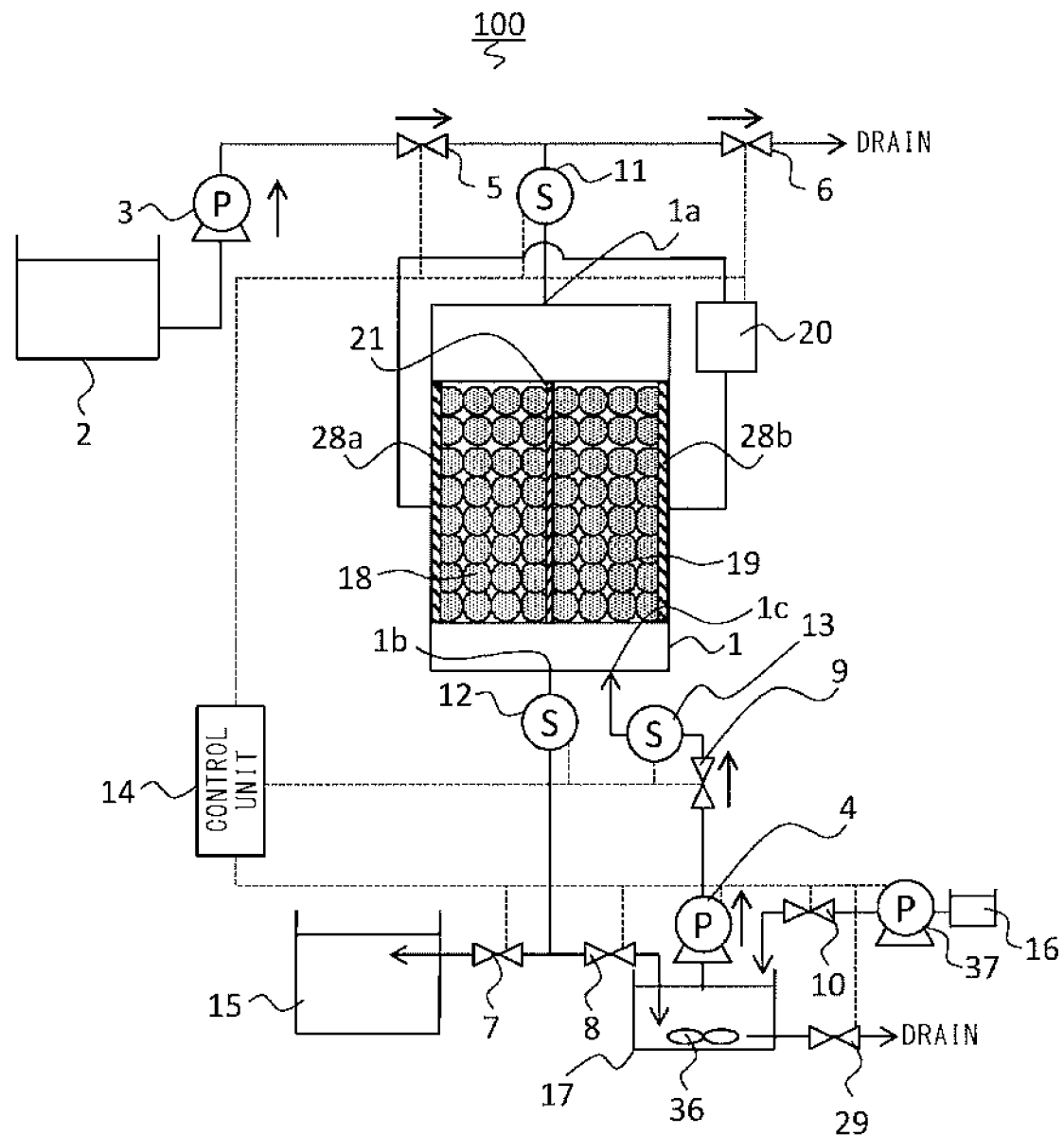
FIG. 1 is a configuration diagram of a water treatment apparatus according to embodiment 1 of the present invention.

FIG. 1 is a configuration diagram of a water treatment apparatus according to embodiment 1 of the present invention. A water treatment apparatus 100 includes: a water treatment unit 1 having an inlet port 1a through which treatment target water flows in, an outlet port 1b through which desalinated water flows out, and a washing water inlet port 1c through which washing water or additive containing washing water flows in at the time of reverse washing, the water treatment unit 1 being configured to perform desalination for the treatment target water; a raw water tank 2 which is connected to the water treatment unit 1 via a treatment target water measurement unit 11, a treatment target water supply valve 5, and then a treatment target water supply pump 3, and which stores treatment target water; a treated water tank 15 which is connected to the water treatment unit 1 via a desalinated water measurement unit 12 and then a desalinated water sending valve 7 and which stores treatment target water that has been desalinated by the water treatment unit 1; and a reverse washing water tank 17 which is connected to the water treatment unit 1 via the desalinated water measurement unit 12 and then a desalinated water sending valve 8 and which stores washing water for reverse washing. In the water treatment unit 1, the inlet port 1a is provided on one side of the water treatment unit 1, and the outlet port 1b and the washing water inlet port 1c are provided on the other side of the water treatment unit 1.

The reverse washing water tank 17 is connected to the water treatment unit 1 also through a route passing a washing water supply pump 4 for supplying washing water to the water treatment unit 1 at the time of reverse washing, a washing water supply valve 9, and then a washing water measurement unit 13. The reverse washing water tank 17, the washing water supply pump 4, and the washing water supply valve 9 are configured to be capable of supplying washing water to the water treatment unit 1 in a direction opposite to the flow direction of the treatment target water. In embodiment 1, a combination of the reverse washing water tank 17, the washing water supply pump 4, and the washing water supply valve 9 serves as a "supply unit".

Washing water supplied to the water treatment unit 1 can be drained from the water treatment unit 1 via the treatment target water measurement unit 11 and then a drain valve 6. The reverse washing water tank 17 is connected to an additive storage tank 16 via an additive supply valve 10 and then an additive supply pump 37. The reverse washing water tank 17 is provided with a stirrer 36 for stirring and mixing an additive and washing water when the additive is supplied. Washing water in the reverse washing water tank 17 can be drained via the drain valve 29. In embodiment 1, a combination of the additive storage tank 16, the additive supply pump 37, and the additive supply valve 10 serves as an "additive supply unit". The additive stored in the additive storage tank 16 contains a substance such as an oxidizing agent, an acid, or an alkali having a property of decomposing biofilm and/or scale.

In the water treatment unit 1, a pair of collectors 28a, 28b connected to a power supply unit 20 are provided at both ends, and between the collectors 28a, 28b, a first granular electrode member 18, i.e., a first electrode, and a second granular electrode member 19, i.e., a second electrode are provided so as to be opposed to each other and separated from each other by a separator 21. The first granular electrode member 18 and the second granular electrode member 19 each include a plurality of granular electrode members. The first granular electrode members 18 or the second granular electrode members 19 are in contact with each other, but the first granular electrode member 18 and the second granular electrode member 19 are prevented from coming into contact with each other, by the separator 21.

The pair of collectors 28a, 28b are provided for passing electricity throughout the first granular electrode member 18 and the second granular electrode member 19 at the time of charging, and collecting electricity from the first granular electrode member 18 and the second granular electrode member 19 at the time of discharging, and the pair of collectors 28a, 28b are in contact with the first granular electrode member 18 and the second granular electrode member 19, respectively. The pair of collectors 28a, 28b is made from a good electric conductor such as a graphite sheet, a graphite plate, GRAFOIL (registered trademark), a titanium plate, a stainless plate, or a copper plate.

The first granular electrode member 18 and the second granular electrode member 19 serve to adsorb ions in the treatment target water when voltage is applied. Therefore, the first granular electrode member 18 and the second granular electrode member 19 are made from activated carbon, porous carbon, porous conductive beads, porous metal, or the like having a great conductivity and a great specific surface area and having a great capacitance as a capacitor. The granular electrode members included in the first granular electrode member 18 and the second granular electrode member 19 in the present embodiment are not made into a sheet form or the like, and are provided in the water treatment unit 1 in a state in which the granules are not fixed to each other. That is, the first granular electrode member 18 and the second granular electrode member 19 are each configured to include a plurality of flowable granular electrode members.

The separator 21 is provided for preventing short-circuit between the first granular electrode member 18 and the second granular electrode member 19, and is made from filter paper, a porous film, nonwoven fabric, a foamed material, or the like through which a liquid easily passes and which has an electric insulation property.

As the treatment target water measurement unit 11, the desalinated water measurement unit 12, and the washing water measurement unit 13 connected to the water treatment unit 1, for example, an electric conductivity meter or the like that is capable of measuring the electric conductivity or electric resistance of a liquid and capable of outputting a result of the measurement as a signal, is used.

The treatment target water supply pump 3, the washing water supply pump 4, the additive supply pump 37, the treatment target water measurement unit 11, the desalinated water measurement unit 12, the washing water measurement unit 13, the treatment target water supply valve 5, the drain valves 6, 29, the desalinated water sending valves 7, 8, the washing water supply valve 9, the additive supply valve 10, and the power supply unit 20 are connected to a control unit 14, and are controlled by the control unit 14 during execution of each processing step. As the control unit 14, a programmable logic controller (PLC), a sequencer, a numerical control device, or the like for operating a device in accordance with a specified condition, is used.

Figure 18:
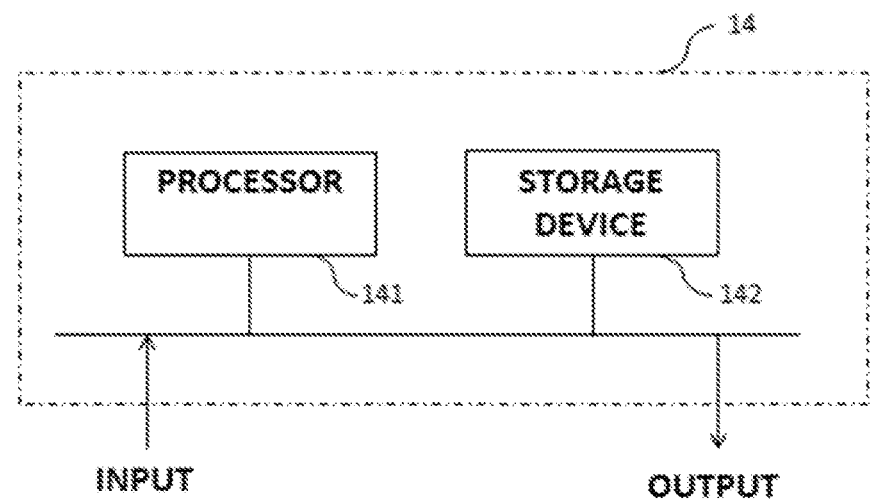
FIG. 18 shows an example of hardware of the control unit of a water treatment apparatus according to embodiment 1 of the present invention.

FIG. 18 shows an example of hardware of the control unit 14. The control unit 14 is composed of a processor 141 and a storage unit 142 as shown in FIG. 18. The storage device 142 includes, although not shown, a volatile storage device such as a random access memory, and a nonvolatile auxiliary storage device such as a flash memory. The storage device 142 may include, instead of a flash memory, an auxiliary storage device such as a hard disk. The processor 141 executes a program loaded from the storage device 142. In this case, the program is loaded from the auxiliary storage device to the processor 141 via the volatile storage device. The processor 141 may output data of the calculation result and the like to the volatile storage device of the storage device 142, or may store the data in the auxiliary storage device via the volatile storage device.

Next, operation will be described. In the water treatment method according to the present embodiment, while a cycle of desalination of treatment target water in the water treatment unit 1 and washing of the water treatment unit 1 is repeated, desalination of the treatment target water is sequentially performed, and as described later, washing of the water treatment unit 1 includes two washing methods, i.e., reverse washing and addition reverse washing.

Figure 2:
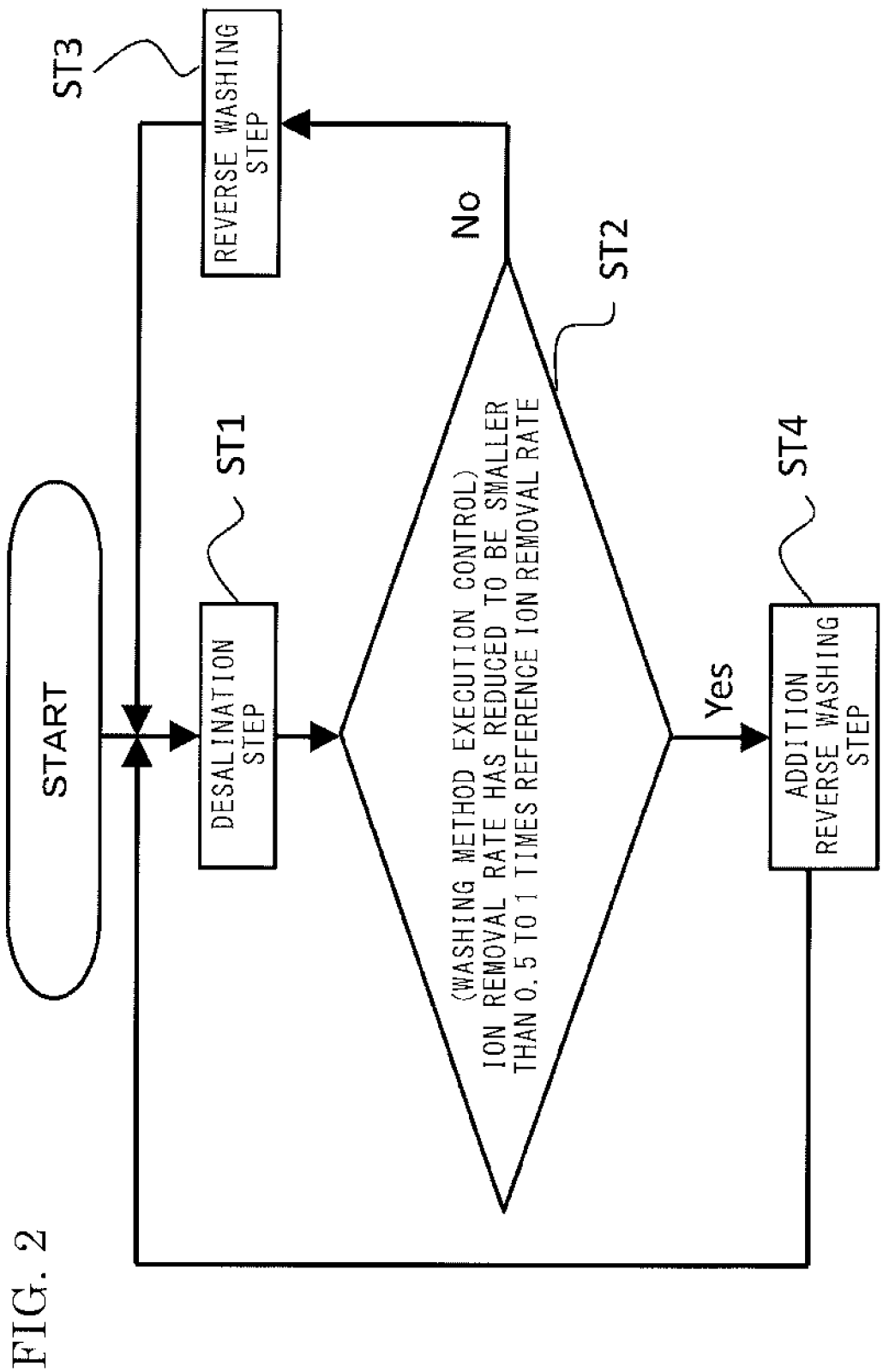
FIG. 2 is a flowchart showing a water treatment method according to embodiment 1 of the present invention.

FIG. 2 is a flowchart showing the water treatment method according to embodiment 1. After the water treatment apparatus 100 is activated, a "desalination step" is executed in which treatment target water is desalinated using the water treatment unit 1, and the desalinated water is stored into the reverse washing water tank 17 and the treated water tank 15 (step ST1). After the desalination step is finished, "washing method execution control" is performed for determining whether to execute a "reverse washing step" of performing reverse washing in which the water treatment unit 1 is washed by injecting washing water into the water treatment unit 1 in the direction opposite to the treatment target water flow-in direction, or an "addition reverse washing step" of washing the water treatment unit 1 by injecting additive containing washing water or an additive into the water treatment unit 1 in the direction opposite to the treatment target water flow-in direction (step ST2). As a result of the washing method execution control in step ST2, if the reverse washing step is determined to be executed, the process proceeds to step ST3, and if the addition reverse washing step is determined to be executed, the process proceeds to step ST4.

After washing of the water treatment unit 1 in the reverse washing step (step ST3) or washing of the water treatment unit 1 in the addition reverse washing step (step ST4) is finished, the process returns to step ST1 to execute the desalination step. Thereafter, the same cycle is repeated. Hereinafter, the "desalination step", the "reverse washing step", the "addition reverse washing step", and the "washing method execution control" will be described in detail.

<Desalination Step>

In the desalination step, first, the treatment target water supply valve 5 is opened, and the drain valve 6 is closed. Next, the treatment target water supply pump 3 is activated to send treatment target water in the raw water tank 2 so as to be supplied to the water treatment unit 1. The treatment target water is supplied through the upper inlet port 1a of the water treatment unit 1 into the water treatment unit 1, and then flows downward. In addition, DC voltage is applied to the pair of collectors 28a, 28b by the power supply unit 20. As described above, the pair of collectors 28a, 28b are in contact with the first granular electrode member 18 and the second granular electrode member 19, and therefore DC voltage is applied also between the first granular electrode member 18 and the second granular electrode member 19, and the first granular electrode member 18 and the second granular electrode member 19 are attracted by a Coulomb force so as to be in contact with the pair of collectors 28a, 28b, respectively, whereby the electrically connected state is maintained. In this way, during execution of the desalination step, the state in which DC voltage is applied to the first granular electrode member 18 and the second granular electrode member 19 is maintained, and ions contained in the treatment target water flowing in the water treatment unit 1 are adsorbed and removed by a Coulomb force to the first granular electrode member 18 and the second granular electrode member 19, whereby the treatment target water is desalinated. The desalinated treatment target water is discharged as desalinated water through the lower outlet port 1b of the water treatment unit 1. It should be noted that in the present invention "adsorbed and removed" means "adsorbed to the first granular electrode member and the second granular electrode member and removed from the treatment target water."

While the desalination is being performed as described above, until a prescribed amount of the water is stored in the reverse washing water tank 17, the desalinated water sending valve 7 is closed and the desalinated water sending valve 8 is opened so that the treatment target water that has undergone the desalination is sent and stored into the reverse washing water tank 17. The desalinated water stored in the reverse washing water tank 17 is used as washing water in the reverse washing step or the addition reverse washing step. When the prescribed amount of the water is stored in the reverse washing water tank 17, the desalinated water sending valve 8 is closed and the desalinated water sending valve 7 is opened so that the treatment target water that has undergone the desalination is sent to the treated water tank 15. After a predetermined time has elapsed since the start of the desalination step, the treatment target water supply pump 3 is stopped and the treatment target water supply valve 5 and the desalinated water sending valve 7 are closed. In addition, application of DC voltage by the power supply unit 20 is stopped, whereby the desalination step is finished. In the desalination step of the present embodiment, the inlet port 1a and the outlet port 1b are provided so that treatment target water flows downward in the water treatment unit 1. However, the inlet port 1a and the outlet port 1b may be provided so that treatment target water flows upward or in the horizontal direction in the water treatment unit 1.

The time period during which the desalination step is executed is 3 to 200 minutes, or desirably, 5 to 50 minutes. If the time period is shorter than 3 minutes, the frequency of switching between desalination and washing increases and thus efficiency in the entire cycle is reduced. On the other hand, if the time period is longer than 200 minutes, ions are adsorbed into a deep part of each granular electrode member and the ions are less likely to be desorbed. As a result, a time period taken for washing is prolonged. Therefore, 5 to 50 minutes are desirable from the perspective of the frequency of switching between desalination and washing and ease of desorption of the adsorbed ions.

<Washing Method Execution Control>

After the desalination step is finished, the control unit 14 executes execution control to determine whether to execute the reverse washing step or the addition reverse washing step, using an ion removal rate in the water treatment unit 1 as a determination index. Here, the "ion removal rate" is a value obtained by dividing the difference between the electric conductivity of treatment target water and the electric conductivity of desalinated water by the electric conductivity of the treatment target water and then converting the result into percentage, and thus indicates the height of desalination efficiency in the water treatment unit 1.

First, the control unit 14 acquires the electric conductivity of the treatment target water and the electric conductivity of the desalinated water from the treatment target water measurement unit 11 and the desalinated water measurement unit 12, to calculate the present ion removal rate in the water treatment unit 1, and stores the ion removal rate into a storage unit (not shown). Next, the control unit 14 reads, from the storage unit (not shown), the greater one (hereinafter, referred to as "reference ion removal rate") of the ion removal rate at the time when the first-time desalination step is finished after the water treatment apparatus 100 has been activated, and the ion removal rate at the time when the first-time desalination step is finished after the previous addition reverse washing step has been executed, and compares the reference ion removal rate with the present ion removal rate. If the present ion removal rate is smaller than 0.5 to 1.0 times, or desirably, smaller than 0.7 to 0.9 times the reference ion removal rate, the ion removal rate has been reduced due to biofilm and/or scale, and therefore the control unit 14 determines to execute the addition reverse washing step. If the present ion removal rate is equal to or greater than 1.0 times the reference ion removal rate, or desirably, equal to or greater than 0.9 times the reference ion removal rate, the ion removal rate in the water treatment unit 1 has not been reduced or has been slightly reduced and thus it is not necessary to execute the addition reverse washing. Therefore, the control unit 14 determines to execute the reverse washing step. If the present ion removal rate is smaller than 0.5 times the reference ion removal rate, or desirably, smaller than 0.7 times the reference ion removal rate, the ion removal rate has been significantly reduced and therefore the control unit 14 determines that it is difficult to restore the ion removal rate by the addition reverse washing step. In such a case, for example, the control unit 14 causes a display unit (not shown) to display an alarm indication for notification that it is necessary to replace the first granular electrode member 18 and the second granular electrode member 19, thereby prompting a user to replace the first granular electrode member 18 and the second granular electrode member 19.

<Reverse Washing Step>

In the reverse washing step, first, in a state in which the drain valve 6 and the washing water supply valve 9 are opened and the treatment target water supply valve 5 is closed, the washing water supply pump 4 is activated to inject the washing water in the reverse washing water tank 17 into the water treatment unit 1 in a direction from the lower washing water inlet port 1c to the upper inlet port 1a of the water treatment unit 1, i.e., the direction opposite to the flow of the treatment target water. The washing water injected into the water treatment unit 1 flows upward and flows out through the inlet port 1a to the upper side of the water treatment unit 1, and thereafter, is drained through the drain valve 6.

In the reverse washing step, DC voltage is not applied to the pair of collectors 28a, 28b. Therefore, the first granular electrode member 18 and the second granular electrode member 19 are not attracted to the pair of collectors 28a, 28b by a Coulomb force, and the respective granular electrode members are able to flow. In addition, since DC voltage is not applied to the first granular electrode member 18 and the second granular electrode member 19, the first granular electrode member 18 and the second granular electrode member 19 do not adsorb ions in the washing water and therefore scale is not newly generated. In addition, a phenomenon in which microorganisms and the like in the washing water are attracted to newly generate biofilm, does not occur.

Biofilm and/or scale that has been already adhered to the surfaces of the first granular electrode member 18 and the second granular electrode member 19 are removed by a shear force acting on the surfaces of the granular electrode members owing to the flow of the washing water. In some cases, biofilm and/or scale is strongly adhered or fixed to the surfaces of the granular electrode members, and it might be difficult to remove the biofilm and/or scale merely by the washing water flowing on the surfaces of the granular electrode members. However, as described above, the first granular electrode member 18 and the second granular electrode member 19 in the present embodiment are provided in the water treatment unit 1 such that the granules are not fixed to each other. Therefore, by the flow of the washing water, the first granular electrode member 18 and the second granular electrode member 19 also flow. Thus, as the washing water flows, contact or collision occurs between the granular electrode members, whereby biofilm, scale, and the like that are strongly adhered or fixed to the surfaces of the granular electrode members can be removed by being torn off by a physical force.

During execution of the reverse washing step, the electric conductivity of the washing water before injection into the water treatment unit 1 is measured by the washing water measurement unit 13 and the electric conductivity of the washing water after passing through the water treatment unit 1 is measured by the treatment target water measurement unit 11, and then a result of the measurement by the treatment target water measurement unit 11 is compared with a result of the measurement by the washing water measurement unit 13. In the case where the result of measurement by the treatment target water measurement unit 11 is 1 to 1.5 times, or desirably, 1 to 1.2 times the result of measurement by the washing water measurement unit 13, it is considered that washing has been sufficiently performed, and therefore the washing water supply pump 4 is stopped and the washing water supply valve 9 is closed, to finish the reverse washing step. In the case where the result of measurement by the treatment target water measurement unit 11 is greater than 1.5 times the result of measurement by the washing water measurement unit 13, biofilm and/or scale still remains in the water treatment unit 1 and the washing is insufficient, and therefore the reverse washing step is continued. It is noted that, in the reverse washing step, since DC voltage is not applied to the pair of collectors 28a, 28b and the first granular electrode member 18 and the second granular electrode member 19 by the power supply unit 20, a phenomenon in which ions contained in the washing water injected into the water treatment unit 1 are adsorbed and removed to the first granular electrode member 18 and the second granular electrode member 19 and the electric conductivity of the washing water is reduced, does not occur. Therefore, the result of measurement by the treatment target water measurement unit 11 does not become smaller than 1 times the result of measurement by the washing water measurement unit 13.

As described above, the washing water used in the reverse washing step is water obtained by storing the desalinated water generated in the desalination step, into the reverse washing water tank 17. Therefore, in the case where the amount of necessary washing water is large, the prescribed amount of desalinated water to be stored into the reverse washing water tank 17 also increases, and the desalinated water stored into the treated water tank 15 decreases, leading to reduction in the recovery rate for the desalinated water. On the other hand, if each electrode member expands and the surface area thereof increases, the contact area thereof with the washing water increases and contact and collision between the electrode members become more likely to occur. Therefore, from the perspective of effective physical washing, it is desirable that a certain degree of expansion occurs. Accordingly, from the perspective of balance between the recovery rate for the treated water and effective physical washing, the expansion rate of the first granular electrode member 18 and the second granular electrode member 19 in the reverse washing step are set to 0 to 200%, or desirably, 20 to 50%. Here, the "expansion rate" indicates the percentage by which the volume of the first granular electrode member 18 and the second granular electrode member 19 in the washing step has increased as compared to the volume at the time of the desalination step. When expansion does not occur, i.e., when the volume does not differ from the volume at the time of the desalination step, the expansion rate is 0%. The expansion rate is determined by the flow rate of the washing water, and therefore it is possible to set the expansion rate to a desired value by the control unit 14 controlling the flow rate of the washing water.

<Addition Reverse Washing Step>

In the addition reverse washing step, first, the additive supply valve 10 is opened and the additive supply pump 37 is activated to add a predetermined amount of additive to the washing water in the reverse washing water tank 17 from the additive storage tank 16. Next, the stirrer 36 stirs and mixes the additive and the washing water to generate additive containing washing water. In the case where the additive is hydrogen peroxide, the additive is added to the reverse washing water tank 17 so that the hydrogen peroxide concentration in the reverse washing water tank 17 becomes 0.0001 to 5%, or desirably, 0.001 to 1%. If the hydrogen peroxide concentration in the reverse washing water tank 17 is smaller than 0.0001%, the hydrogen peroxide concentration is too low so that, when the additive containing washing water is injected into the water treatment unit 1, the hydrogen peroxide is consumed before being distributed over the entirety of the first granular electrode member 18 and the second granular electrode member 19, and therefore the washing effect is small. On the other hand, if the hydrogen peroxide concentration is greater than 5%, foaming by reaction with the first granular electrode member 18 and the second granular electrode member 19 occurs vigorously, so that bubbles remain in pores of the activated carbon. The bubbles remaining in pores of the activated carbon hampers ion adsorption in the desalination step, thus deteriorating efficiency of the desalination.

Next, in a state in which the drain valve 6 and the washing water supply valve 9 are opened and the treatment target water supply valve 5 is closed, the washing water supply pump 4 is activated to inject the additive containing washing water in the reverse washing water tank 17 into the water treatment unit 1 in a direction from the lower washing water inlet port 1c to the upper inlet port 1a of the water treatment unit 1, i.e., the direction opposite to the flow of the treatment target water. The additive containing washing water injected into the water treatment unit 1 flows upward and flows out through the inlet port 1a to the upper side of the water treatment unit 1, and thereafter, is drained through the drain valve 6.

Also in the addition reverse washing step, as in the case of the reverse washing step, biofilm and/or scale that has been already adhered to the surfaces of the first granular electrode member 18 and the second granular electrode member 19 is removed by a shear force acting on the surfaces of the granular electrode members owing to the flow of the additive containing washing water. In addition, regarding the first granular electrode member 18 and the second granular electrode member 19 in the present embodiment, by the flow of the additive containing washing water, the first granular electrode member 18 and the second granular electrode member 19 also flow. Therefore, the additive containing washing water spreads over the entirety of the first granular electrode member 18 and the second granular electrode member 19, and thus biofilm, scale, and the like adhered to the surfaces of the granular electrode members can be uniformly removed.

In the addition reverse washing step, the flow rate of the additive containing washing water is controlled by the control unit 14 so that the expansion rate of the first granular electrode member 18 and the second granular electrode member 19 is 10 to 200%, or desirably, 10 to 100%. If the expansion rate is greater than 200%, the amount of necessary washing water becomes too large, and the prescribed amount of desalinated water to be stored into the reverse washing water tank 17 in the desalination step increases. As a result, the desalinated water stored into the treated water tank 15 decreases, leading to reduction in the recovery rate for the desalinated water. It is noted that, in the reverse washing step, a value of 0 to 10% is also possible for the expansion rate, but in the addition reverse washing step, in the case where the expansion rate is smaller than 10%, expansion of the first granular electrode member 18 and the second granular electrode member 19 is small and therefore physical washing of the surfaces of the granular electrode members cannot be performed effectively.

After the additive containing washing water the amount of which is 2 to 10 times, or desirably, 3 to 5 times the volume of the first granular electrode member 18 and the second granular electrode member 19 is injected into the water treatment unit 1, the washing water supply pump 4 is stopped and the washing water supply valve 9 is closed. If the amount of the additive containing washing water injected into the water treatment unit 1 is smaller than 2 times the volume of the first granular electrode member 18 and the second granular electrode member 19, the additive is not sufficiently distributed to the surfaces of the granular electrode members and therefore biofilm and/or scale adhered to the surfaces of the granular electrode members is not completely decomposed and removed. On the other hand, if the amount of the additive containing washing water injected into the water treatment unit 1 is larger than 10 times the volume of the first granular electrode member 18 and the second granular electrode member 19, the prescribed amount of desalinated water to be stored into the reverse washing water tank 17 in the desalination step increases. As a result, the desalinated water stored into the treated water tank 15 decreases, leading to reduction in the recovery rate for the desalinated water.

Next, in a state in which the desalinated water sending valve 7 is closed, the treatment target water supply valve 5, the desalinated water sending valve 8, and the drain valve 29 are opened, and the treatment target water supply pump 3 is activated to send the treatment target water from the raw water tank 2 to the water treatment unit 1, so that the additive containing washing water remaining in the water treatment unit 1 is caused to flow out and is drained from the reverse washing water tank 17 through the drain valve 29. After the flowing-out of the additive containing washing water is finished, the treatment target water supply pump 3 is stopped, and the treatment target water supply valve 5 and the drain valve 29 are closed, to finish the addition reverse washing step. The amount of treatment target water used for causing the additive containing washing water to flow out from the water treatment unit 1 is 1 to 10 times, or desirably, 2 to 5 times the volume of the first granular electrode member 18 and the second granular electrode member 19. If the amount of treatment target water used for causing the additive containing washing water to flow out is smaller than 1 times the volume of the first granular electrode member 18 and the second granular electrode member 19, it is impossible to cause the entire additive containing washing water to flow out from the water treatment unit 1. On the other hand, if the amount of treatment target water is larger than 10 times the volume of the first granular electrode member 18 and the second granular electrode member 19, the amount of treatment target water used for causing the additive containing washing water to flow out increases, so that the recovery rate for the desalinated water is reduced. In addition, a time period required for causing the additive containing washing water to flow out is prolonged and thus a time period taken for the addition reverse washing step is also prolonged, whereby efficiency of the entire cycle is reduced.

It is noted that, in the case where, in light of the property of the desalinated water, there is no adverse effect even if the additive remains in the water treatment unit 1, the operation of causing the additive containing washing water to flow out from the water treatment unit 1 may be omitted.

In FIG. 1, an example in which the inlet port 1*a* is provided on one side of the water treatment unit 1, and the outlet port 1*b* and the washing water inlet port 1*c* are provided on the other side of the water treatment unit 1, has been shown. However, the water treatment unit 1 may be configured as shown in other examples in FIG. 3A to FIG. 3D. In the example shown in FIG. 3A, the inlet port 1*a* and the washing water inlet port 1*c* are provided on one side of the water treatment unit 1, and the outlet port 1*b* and a washing water outlet port 1*d* are provided on the other side of the water treatment unit 1. A second washing water measurement unit 131 for measuring the electric conductivity or the like of washing water having flowed through the water treatment unit 1, is provided to a pipe connected to the washing water outlet port 1*d*. After the electric conductivity is measured by the second washing water measurement unit 131, the washing water is discharged to outside of the system. In the example in FIG. 3A, in the reverse washing step and the addition reverse washing step, whether or not washing has been sufficiently performed is determined through comparison between a result of measurement by the washing water measurement unit 13 and a result of measurement by the second washing water measurement unit 131.

Figure 3A:
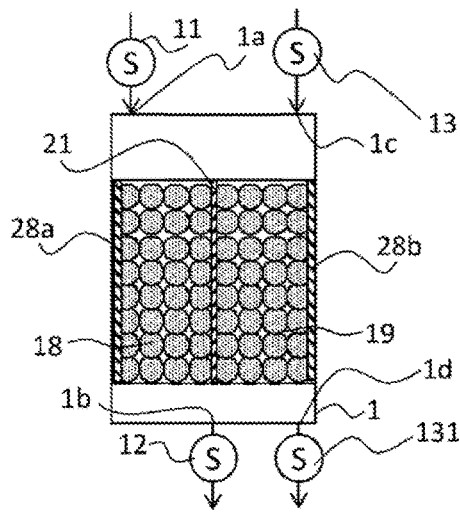
FIG. 3A to FIG. 3D show other examples of a water treatment unit according to embodiment 1.
Figure 3B:
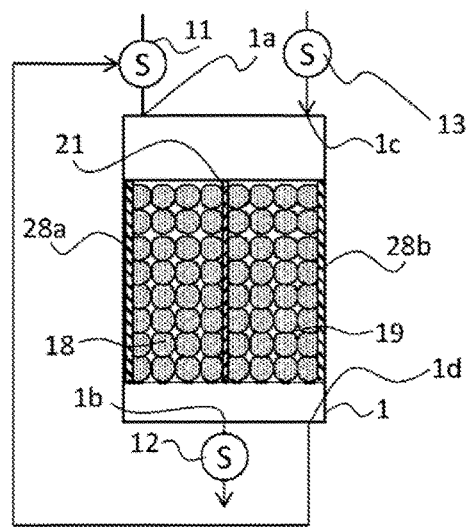

In the example in FIG. 3A, the flow direction of the washing water in the reverse washing step and the flow direction of the additive containing washing water in the addition reverse washing step are the same as the flow direction of the treatment target water in the desalination step. In the case where the flow direction of the washing water and the flow direction of the additive containing washing water are opposite to the flow direction of the treatment target water, as described above, the expansion rate of the first granular electrode member 18 and the second granular electrode member 19 in the addition reverse washing step needs to be equal to or greater than 10%. However, in the case where the flow direction of the washing water and the flow direction of the additive containing washing water are the same as the flow direction of the treatment target water, the expansion rate of the first granular electrode member 18 and the second granular electrode member 19 in the addition reverse washing step may be 0%. Thus, there is an advantage that the amounts of washing water and additive containing washing water needed for washing are decreased. As shown in the example in FIG. 3B, the washing water outlet port 1*d* may be connected to the treatment target water measurement unit 11, whereby the second washing water measurement unit 131 may be omitted. Although not shown, the washing water outlet port 1*d* may be connected to the desalinated water measurement unit 12, and also in this case, the second washing water measurement unit 131 may be omitted.

Figure 3C:
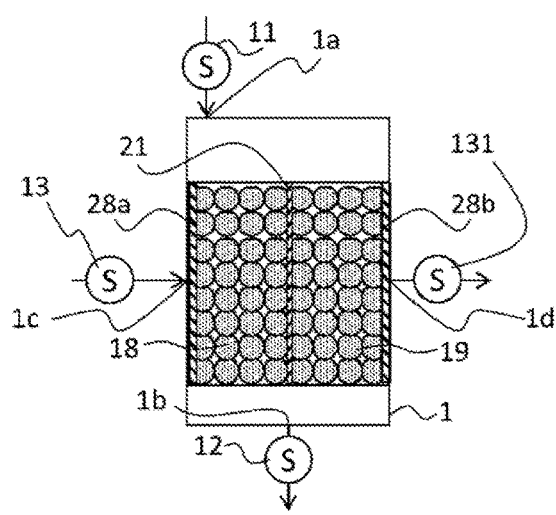
Figure 3D:
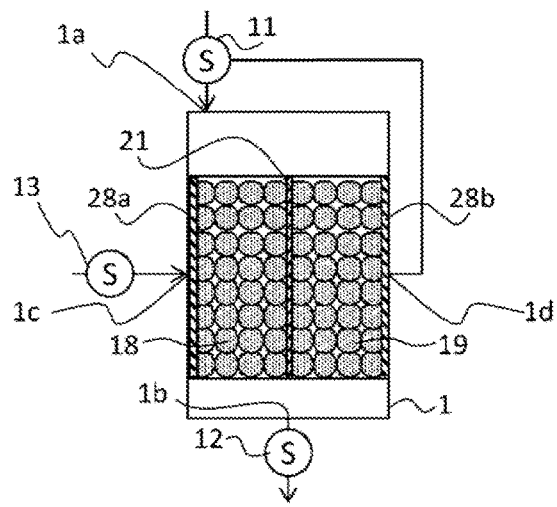

As shown in the examples in FIG. 3C and FIG. 3D, the washing water inlet port 1*c* and the washing water outlet port 1*d* may be provided to the collector 28*a* and the collector 28*b*. Also in this case, as shown in the example in FIG. 3C, the second washing water measurement unit 131 may be provided to a pipe connected to the washing water outlet port 1*d*, or as shown in the example in FIG. 3D, the washing water outlet port 1*d* may be connected to the treatment target water measurement unit 11, whereby the second washing water measurement unit 131 may be omitted. Although not shown, the washing water outlet port 1*d* may be connected to the desalinated water measurement unit 12, and also in this case, the second washing water measurement unit 131 may be omitted. Also in the example in FIG. 3D, the expansion rate of the first granular electrode member 18 and the second granular electrode member 19 in the addition reverse washing step may be 0%.

The configurations of the water treatment units shown in FIG. 3A to FIG. 3D are applicable also in embodiment 2 and the subsequent embodiments.

SPECIFIC EXAMPLES

Hereinafter, the present invention will be further described using examples. In the examples, water obtained by filtering urban sewage water having electric conductivity of 2 mS/cm and DOC of 10 mg/L was used as treatment target water. Granular activated carbon was used as the first granular electrode member 18 and the second granular electrode member 19, and the amount of the activated carbon is 10 L. The flow speed of the treatment target water in the desalination step was 0.1 m/min, and the flow speeds of the washing water in the reverse washing step and the additive containing washing water in the addition reverse washing step were 0.5 m/min. A hydrogen peroxide solution was used as the additive, and the hydrogen peroxide concentration in the additive containing washing water was 1%.

Example 1

Under the above condition of the treatment target water, the activated carbon amount, and the flow speed, the desalination step and the reverse washing step were executed for eight cycles. In example 1, the addition reverse washing step was not executed. As a result of inspection in example 1, the following table 1 was obtained.

TABLE 1

| Cycle | First time | Second time | Third time | Fourth time | Fifth time | Sixth time | Seventh time | Eighth time |
|---|---|---|---|---|---|---|---|---|
| Ion removal rate (%) when desalination step was finished | 70 | 66 | 61 | 60 | 58 | 56 | 53 | 52 |
| Reduction width (%) of ion removal rate from when first-time desalination step was finished | — | 4 | 9 | 10 | 12 | 14 | 17 | 18 |

Example 2

Under the above condition of the treatment target water, the activated carbon amount, and the flow speed, the desalination step and the reverse washing step or the addition reverse washing step were executed for eight cycles. A condition for executing the addition reverse washing step was as follows. In the case where the ion removal rate at the time when the desalination step was finished had been reduced by 5% or more as compared to the ion removal rate at the time when the first-time desalination step was finished after the water treatment apparatus 100 was activated or the ion removal rate at the time when the first-time desalination step was finished after the previous addition reverse washing step was executed, the addition reverse washing step was executed after the desalination step. In the case where the above condition was not satisfied, the reverse washing step was executed. On the basis of the above condition for executing the addition reverse washing step, in example 2, the addition reverse washing step was executed after the desalination step was finished for the third time and the sixth time. As a result of inspection in example 2, the following table 2 was obtained.

TABLE 2

| Cycle | First time | Second time | Third time | Fourth time | Fifth time | Sixth time | Seventh time | Eighth time |
|---|---|---|---|---|---|---|---|---|
| Ion removal rate (%) when desalination step was finished | 70 | 66 | 61 | 68 | 65 | 60 | 67 | 63 |

TABLE 2-continued

| Cycle | First time | Second time | Third time | Fourth time | Fifth time | Sixth time | Seventh time | Eighth time |
|---|---|---|---|---|---|---|---|---|
| Reduction width (%) of ion removal rate from when first-time desalination step was finished or when first-time desalination step was finished after addition reverse washing step | — | 4 | 9 | — | 3 | 8 | — | 4 |
| Whether or not addition reverse washing step was performed | No | No | Yes | No | No | Yes | No | No |

Comparative Example 1

Under the above condition of the treatment target water, the activated carbon amount, and the flow speed, the desalination step was executed for eight cycles, and the reverse washing step and the addition reverse washing step were not executed. As a result of inspection in comparative example 1, the following table 3 was obtained.

TABLE 3

| Cycle | First time | Second time | Third time | Fourth time | Fifth time | Sixth time | Seventh time | Eighth time |
|---|---|---|---|---|---|---|---|---|
| Ion removal rate (%) when desalination step was finished | 70 | 66 | 61 | 55 | 49 | 44 | 38 | 35 |
| Reduction width (%) of ion removal rate from when first-time desalination step was finished | — | 4 | 9 | 15 | 21 | 26 | 32 | 35 |

The above results of examples 1, 2 and comparative example 1 are collectively shown in Table 4. As shown in table 4, in example 1 and comparative example 1, the ion removal rate is reduced as the number of times of execution increases, but in comparison between example 1 and comparative example 1, the ion removal rate is sharply reduced in the fourth and subsequent cycles in comparative example 1, whereas the ion removal rate is maintained at high level even in the fourth and subsequent cycles in example 1. Thus, it is found that biofilm and/or scale which is adhered to the electrode members and hampers desalination is removed through execution of the reverse washing step of the present embodiment, whereby reduction in the ion removal rate is suppressed and thus the ion removal rate can be maintained at high level. In addition, in example 2, the ion removal rate is restored at regular intervals. Thus, it is found that biofilm and/or scale that is more strongly adhered to the electrode members and cannot be fully removed by only the reverse washing step can be uniformly removed through execution of the addition reverse washing step, whereby the ion removal rate can be stably maintained at further high level.

In embodiment 1, since the plurality of granular electrodes included in the first granular electrode member and the second granular electrode member are each flowable in the reverse washing step and the addition reverse washing step, washing of the granular electrode members is performed while each granular electrode member is caused to flow by the washing water or the additive containing washing water flowing therethrough. Thus, it is possible to more reliably remove biofilm, scale, and the like strongly adhered or fixed to the electrode surfaces of the granular electrode members, and uniformly wash the entire electrode members.

In addition, by performing reverse washing using additive containing washing water in which an additive having a property of decomposing biofilm and/or scale is contained in washing water, it is possible to more reliably remove biofilm and/or scale that cannot be fully removed by only the reverse washing step.

In addition, the control unit compares the present ion removal rate with a reference ion removal rate which is the greater one of the ion removal rate at the time when the first-time desalination step is finished and the ion removal rate at the time when the first-time desalination step is finished after the previous addition reverse washing step has been executed. Then, in the case where the present ion removal rate is smaller than 0.5 to 1.0 times the reference ion removal rate, the control unit performs control so as to execute reverse washing using washing water to which the additive is added. Thus, it becomes possible to efficiently and effectively execute washing and desalination, whereby the desalination can be performed stably and continuously.

TABLE 4

| Cycle | First time | Second time | Third time | Fourth time | Fifth time | Sixth time | Seventh time | Eighth time |
|---|---|---|---|---|---|---|---|---|
| Ion removal rate (%) in example 1 | 70 | 66 | 61 | 60 | 58 | 56 | 53 | 52 |
| Ion removal rate (%) in example 2 | 70 | 66 | 61 | 68 | 65 | 60 | 67 | 63 |
| Ion removal rate (%) in comparative example 1 | 70 | 66 | 61 | 55 | 49 | 44 | 38 | 35 |

In addition, since desalinated water is used as washing water, it is not necessary to introduce washing water from outside or provide equipment for washing water, so that the equipment can be simplified and the drain amount of washing water can be reduced, and also, the amount of contaminated water can be reduced.

Embodiment 2

Figure 4:
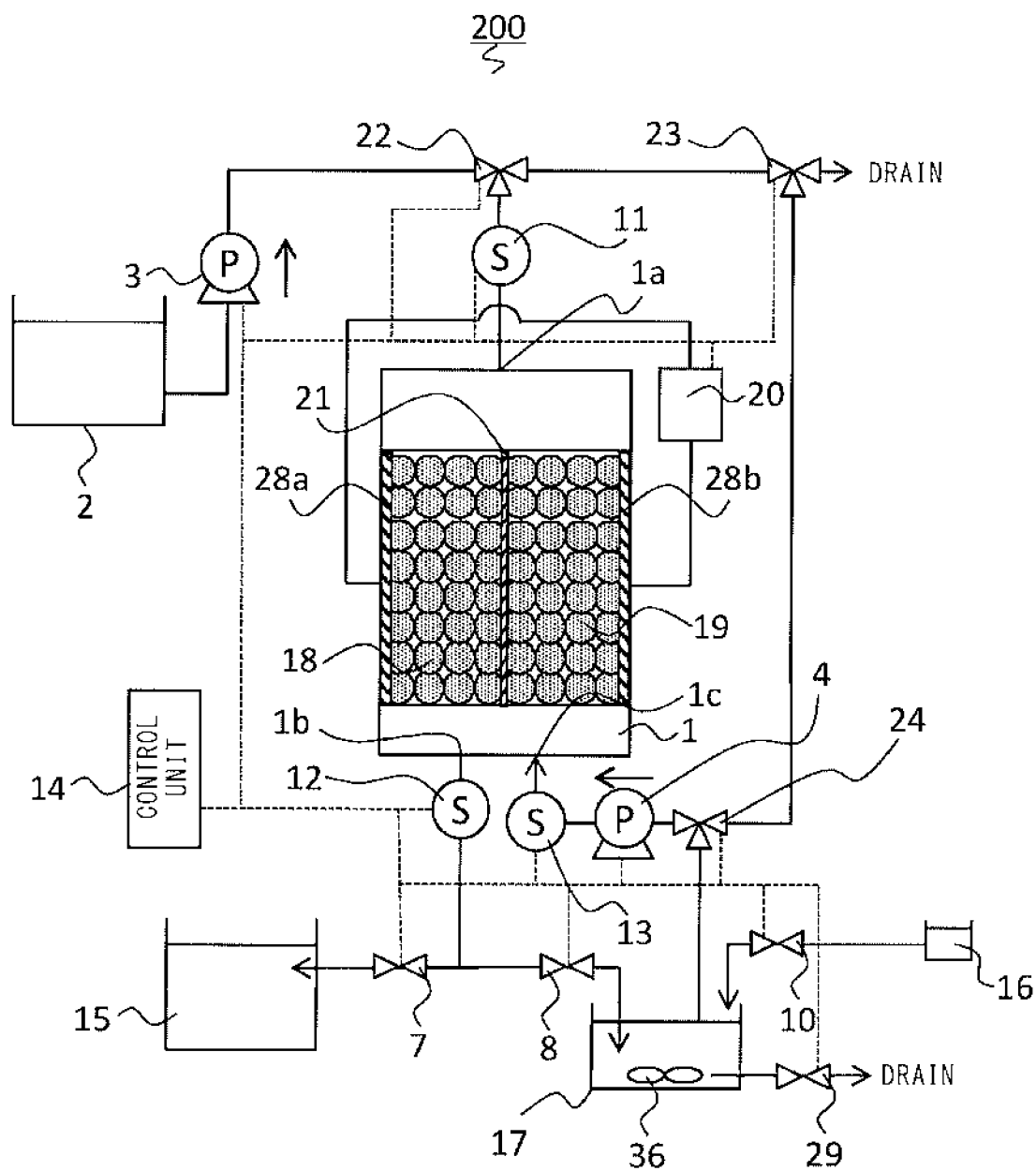
FIG. 4 is a configuration diagram of a water treatment apparatus according to embodiment 2 of the present invention.
Figure 5:
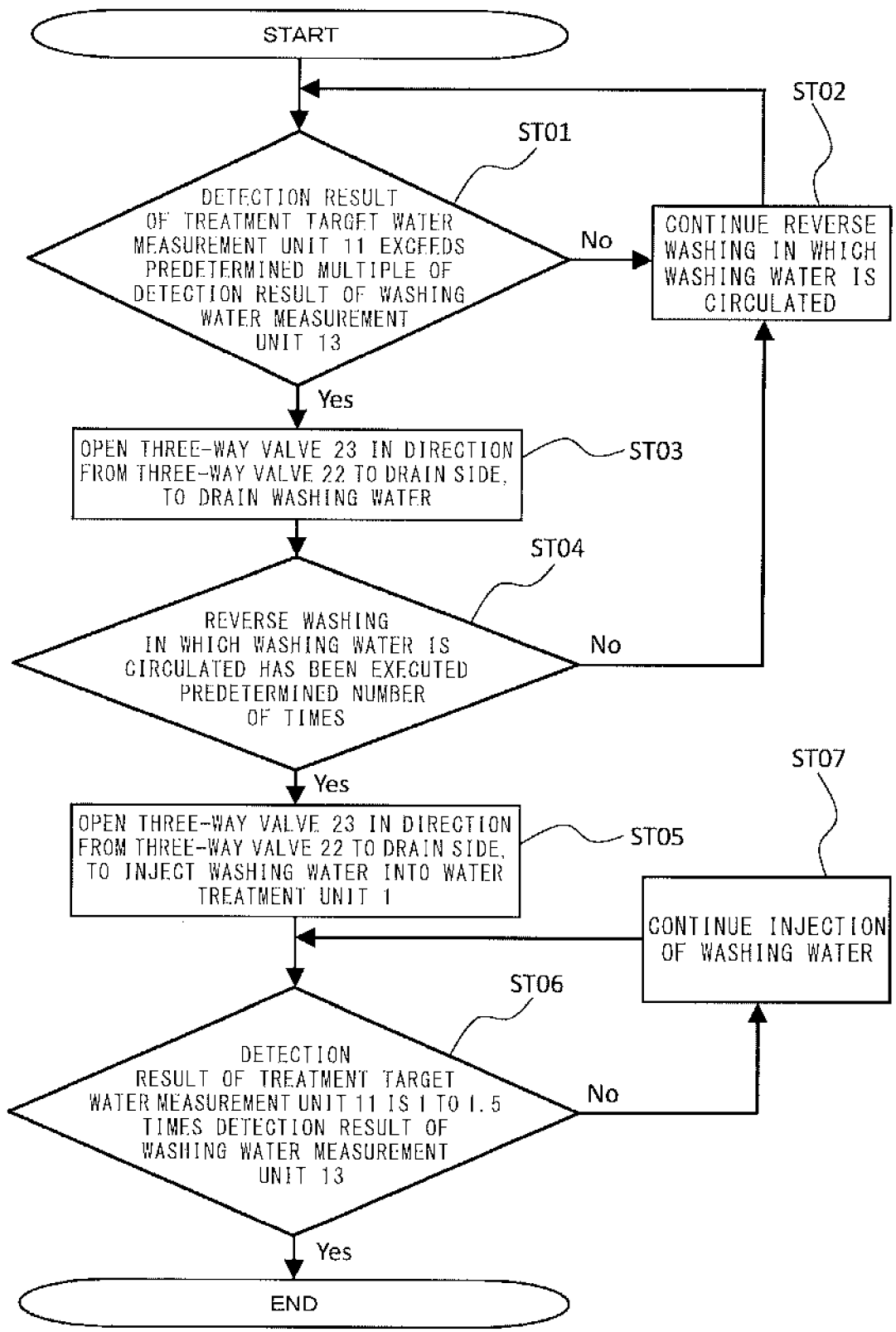
FIG. 5 is a flowchart illustrating a reverse washing step in a water treatment method according to embodiment 2 of the present invention.

Hereinafter, embodiment 2 of the present invention will be described on the basis of FIG. 4 and FIG. 5. Parts that are the same as or correspond to those in FIG. 1 are denoted by the same reference characters, and the description thereof is omitted. Embodiment 2 is different from embodiment 1 in that washing water or additive containing washing water is allowed to circulate. FIG. 4 is a configuration diagram of a water treatment apparatus according to embodiment 2 of the present invention. A water treatment apparatus 200 includes: the water treatment unit 1 which performs desalination for treatment target water; the raw water tank 2 which is connected to the water treatment unit 1 via the treatment target water measurement unit 11, a three-way valve 22, and then the treatment target water supply pump 3, and which stores treatment target water; the treated water tank 15 which is connected to the water treatment unit 1 via the desalinated water measurement unit 12 and then the desalinated water sending valve 7 and which stores treatment target water that has been desalinated by the water treatment unit 1; and the reverse washing water tank 17 which is connected to the water treatment unit 1 via the desalinated water measurement unit 12 and then a three-way valve 24 and which stores washing water for reverse washing. Washing water supplied to the water treatment unit 1 can be drained from the water treatment unit 1 via the treatment target water measurement unit 11 and then a three-way valve 23, and also, can circulate via the treatment target water measurement unit 11, the three-way valve 22, the three-way valve 23, the three-way valve 24, the washing water supply pump 4, and then the washing water measurement unit 13. In circulation of washing water, the washing water supply pump 4 serves as a circulation pump. The three-way valve 22, the three-way valve 23, and the three-way valve 24 are connected to the control unit 14, and are controlled by the control unit 14 during execution of each step.

The other configurations are the same as in embodiment 1 and therefore the description thereof is omitted.

Next, operation will be described. The operation is the same as in embodiment 1 in that desalination of treatment target water is sequentially performed while a cycle of desalination of treatment target water in the water treatment unit 1 and washing of the water treatment unit 1 is repeated. Hereinafter, the "desalination step", the "reverse washing step", and the "addition reverse washing step" will be described in detail. The "washing method execution control" is the same as in embodiment 1 and therefore the description thereof is omitted.

<Desalination Step>

In the desalination step, first, the three-way valve 22 is opened in a direction from the raw water tank 2 to the water treatment unit 1, and the three-way valve 23 is closed. Next, the treatment target water supply pump 3 is activated to send the treatment target water in the raw water tank 2 so as to be supplied to the water treatment unit 1. The treatment target water is supplied through the upper inlet port 1a of the water treatment unit 1 into the water treatment unit 1, and then flows downward. In addition, DC voltage is applied to the first granular electrode member 18 and the second granular electrode member 19 via the pair of collectors 28a, 28b by the power supply unit 20, and ions contained in the treatment target water are adsorbed and removed by a Coulomb force to the first granular electrode member 18 and the second granular electrode member 19, whereby the treatment target water is desalinated.

The other matters are the same as in embodiment 1.

<Reverse Washing Step>

In the reverse washing step, first, in a state in which the three-way valve 24 is opened in a direction from the reverse washing water tank 17 to the washing water supply pump 4, the washing water measurement unit 13, and the water treatment unit 1, and the three-way valve 22 is opened in a direction from the water treatment unit 1 to the three-way valve 23, the washing water supply pump 4 is activated to inject washing water in the reverse washing water tank 17 into the water treatment unit 1 in a direction from the lower washing water inlet port 1c to the upper inlet port 1a of the water treatment unit 1, i.e., the direction opposite to the flow of the treatment target water. At this time, until a predetermined amount of the washing water is stored in the water treatment unit 1, the three-way valve 23 is opened in a direction from the three-way valve 22 to the drain side so that the washing water flowing out from the inlet port 1a is drained.

After the predetermined amount of washing water is stored in the water treatment unit 1, the three-way valve 23 is opened in a direction from the three-way valve 22 to the three-way valve 24, and the three-way valve 24 is opened in a direction from the three-way valve 23 to the washing water measurement unit 13 and the water treatment unit 1. Thus, a circulation path for the washing water is formed, and the washing water circulates by a driving force from the washing water supply pump 4.

Washing of the water treatment unit 1 by circulation of the washing water is performed as follows. FIG. 5 is a flowchart illustrating the reverse washing step in the water treatment method according to embodiment 2, and shows a processing flow after circulation of washing water is started.

While the washing water is circulated, the electric conductivity of the washing water before injection into the water treatment unit 1 is measured by the washing water measurement unit 13 and the electric conductivity of the washing water after passing through the water treatment unit 1 is measured by the treatment target water measurement unit 11, and then a result of the measurement by the treatment target water measurement unit 11 is compared with a result of the measurement by the washing water measurement unit 13 at the time of injection of the washing water. As a result of the comparison, if the result of the measurement by the treatment target water measurement unit 11 exceeds a predetermined multiple in a range of 1 to 5 times, or desirably, 1 to 3 times with respect to the result of the measurement by the washing water measurement unit 13, the process proceeds to step ST03, and on the other hand, if this condition is not satisfied, the process proceeds to step ST02 to continue the circulation (step ST01).

If the condition is not satisfied in step ST01, that is, if the result of the measurement by the treatment target water measurement unit 11 does not exceed the predetermined multiple of the result of the measurement by the washing water measurement unit 13, the washing water is circulated as it is, to continue the reverse washing (step ST02).

If the condition is satisfied in step ST01, that is, if the result of the measurement by the treatment target water measurement unit 11 is greater than the predetermined multiple of the result of the measurement by the washing water measurement unit 13 at the time of injection of the washing water, the three-way valve 23 is switched to be opened in a direction from the three-way valve 22 to the drain side, to drain the circulating washing water (step ST03).

When voltage or current is not applied, the first granular electrode member 18 and the second granular electrode member 19 do not adsorb ions. Therefore, in step ST01, the result of the measurement by the treatment target water measurement unit 11 does not become smaller than 1 times the result of the measurement by the washing water measurement unit 13. On the other hand, if the result of the measurement by the treatment target water measurement unit 11 is greater than 5 times the result of the measurement by the washing water measurement unit 13, the ion concentration in the washing water is close to saturation, so that the ions adsorbed to the first granular electrode member 18 and the second granular electrode member 19 are less likely to be desorbed into the washing water and thus it is considered that washing efficiency has been reduced. If such washing water is circulated, the first granular electrode member 18, the second granular electrode member 19, and the separator 21 might be contaminated again by pollution in the washing water.

If the reverse washing in which the washing water is circulated has been executed a predetermined number of times in a range of 1 to 10 times, or desirably, 1 to 5 times, washing of the water treatment unit 1 by circulation of the washing water is finished and the process proceeds to step ST05, and on the other hand, if this condition is not satisfied, the process returns to step ST02 to continue the reverse washing by circulation (step ST04). It is noted that, regarding the number of times of the reverse washing in which washing water is circulated, operation from the start of circulation of the washing water to draining in step ST03 is counted as one time. In addition, the predetermined multiple in step ST01 may be set per number of times in step ST04.

If the condition is satisfied in step ST04, the three-way valve 23 is kept being opened in a direction from the three-way valve 22 to the drain side and the three-way valve 24 is switched to be opened in a direction from the reverse washing water tank 17 to the washing water measurement unit 13 and the water treatment unit 1, to newly inject the washing water in the reverse washing water tank 17 into the water treatment unit 1 (step ST05). It is noted that, if the number of times of the washing by circulation in step ST04 is larger than 10, the amount of necessary washing water becomes too large, leading to reduction in the recovery rate for the desalinated water.

While the washing water is being injected into the water treatment unit 1, the electric conductivity of the washing water before injection into the water treatment unit 1 is measured by the washing water measurement unit 13 and the electric conductivity of the washing water after passing through the water treatment unit 1 is measured by the treatment target water measurement unit 11, and then a result of the measurement by the treatment target water measurement unit 11 is compared with the result of the measurement by the washing water measurement unit 13. As a result of the comparison, if the result of the measurement by the treatment target water measurement unit 11 is 1 to 1.5 times, or desirably, 1 to 1.2 times the result of the measurement by the washing water measurement unit 13, it is considered that the washing has been sufficiently performed, and thus the washing water supply pump 4 is stopped and the three-way valve 24 is closed, whereby the reverse washing step is finished. If this condition is not satisfied, the process proceeds to step ST07 (step ST06).

If the condition in step ST06 is not satisfied, that is, if the result of the measurement by the treatment target water measurement unit 11 is greater than 1.5 times the result of the measurement by the washing water measurement unit 13, biofilm and/or scale still remains in the water treatment unit 1 and thus the washing is insufficient. Therefore, the washing water is injected into the water treatment unit 1 to continue the reverse washing step (step ST07), and then the process returns to step ST06, whereby the injection of the washing water is continued until the condition is satisfied.

In the reverse washing step in embodiment 2, the flow rate of the washing water is controlled by the control unit 14 so that the expansion rate of the first granular electrode member 18 and the second granular electrode member 19 is 0 to 200%, or desirably, 0 to 100%. As in embodiment 1, if the expansion rate of the first granular electrode member 18 and the second granular electrode member 19 is greater than 200%, the amount of necessary washing water becomes too large, leading to reduction in the recovery rate for the desalinated water. It is noted that, in embodiment 1, a certain degree of expansion is desirable from the perspective of effective physical washing, but in embodiment 2, efficiency of physical washing is ensured by circulation of washing water, and therefore the first granular electrode member 18 and the second granular electrode member 19 may not be expanded.

The other matters are the same as in embodiment 1.

<Addition Reverse Washing Step>

In the addition reverse washing step, as in embodiment 1, first, the additive supply valve 10 is opened and the additive supply pump 37 is activated to add a predetermined amount of additive to the washing water in the reverse washing water tank 17 from the additive storage tank 16. Next, the stirrer 36 stirs and mixes the additive and the washing water to generate additive containing washing water. In the case where the additive is hydrogen peroxide, the additive is added to the reverse washing water tank 17 so that the hydrogen peroxide concentration in the reverse washing water tank 17 becomes 0.0001 to 5%, or desirably, 0.001 to 1%. Next, in a state in which the three-way valve 24 is opened in a direction from the reverse washing water tank 17 to the washing water measurement unit 13 and the water treatment unit 1, and the three-way valve 22 is opened in a direction from the water treatment unit 1 to the three-way valve 23, the washing water supply pump 4 is activated to inject the additive containing washing water in the reverse washing water tank 17 into the water treatment unit 1 in a direction from the lower washing water inlet port 1c to the upper inlet port 1a of the water treatment unit 1, i.e., the direction opposite to the flow of the treatment target water. At this time, until a predetermined amount of the additive containing washing water is stored in the water treatment unit 1, the three-way valve 23 is opened in a direction from the three-way valve 22 to the drain side so that the additive containing washing water flowing out from the inlet port 1a is drained.

After the predetermined amount of additive containing washing water is stored in the water treatment unit 1, the three-way valve 23 is opened in a direction from the three-way valve 22 to the three-way valve 24, and the three-way valve 24 is opened in a direction from the three-way valve 23 to the washing water measurement unit 13 and the water treatment unit 1. Thus, a circulation path for the additive containing washing water is formed, and the additive containing washing water circulates by a driving force from the washing water supply pump 4.

In washing of the water treatment unit 1 by circulation of the additive containing washing water, as in the case of the reverse washing step described above, while the additive containing washing water is circulated, the electric conductivity of the additive containing washing water before injection into the water treatment unit 1 is measured by the washing water measurement unit 13 and the electric conductivity of the additive containing washing water after passing through the water treatment unit 1 is measured by the treatment target water measurement unit 11, and then a result of the measurement by the treatment target water measurement unit 11 is compared with a result of the measurement by the washing water measurement unit 13 at the time of injection of the additive containing washing water. As a result of the comparison, if the result of the measurement by the treatment target water measurement unit 11 exceeds a predetermined multiple in a range of 1 to 5 times, or desirably, 1 to 3 times with respect to the result of the measurement by the washing water measurement unit 13, the three-way valve 23 is switched to be opened in a direction from the three-way valve 22 to the drain side, to drain the circulating additive containing washing water. If the result of the measurement by the treatment target water measurement unit 11 does not exceed the predetermined multiple of the result of the measurement by the washing water measurement unit 13, the additive containing washing water is circulated as it is, to continue the washing.

After the additive containing washing water the amount of which is 2 to 10 times, or desirably, 3 to 5 times the volume of the first granular electrode member 18 and the second granular electrode member 19 is injected into the water treatment unit 1, the washing water supply pump 4 is stopped and the three-way valve 24 is closed. Thereafter, as in embodiment 1, the operation of causing the additive containing washing water to flow out from the water treatment unit 1 is executed, and thus the addition reverse washing step is finished.

In embodiment 2, the same effects as in embodiment 1 can be obtained.

In addition, since the washing water in the reverse washing step and the additive containing washing water in the addition reverse washing step can be used to be circulated, the washing water can be efficiently used and the amount of water needed for washing is decreased, whereby the recovery rate for the desalinated water can be increased.

Embodiment 3

Figure 6:
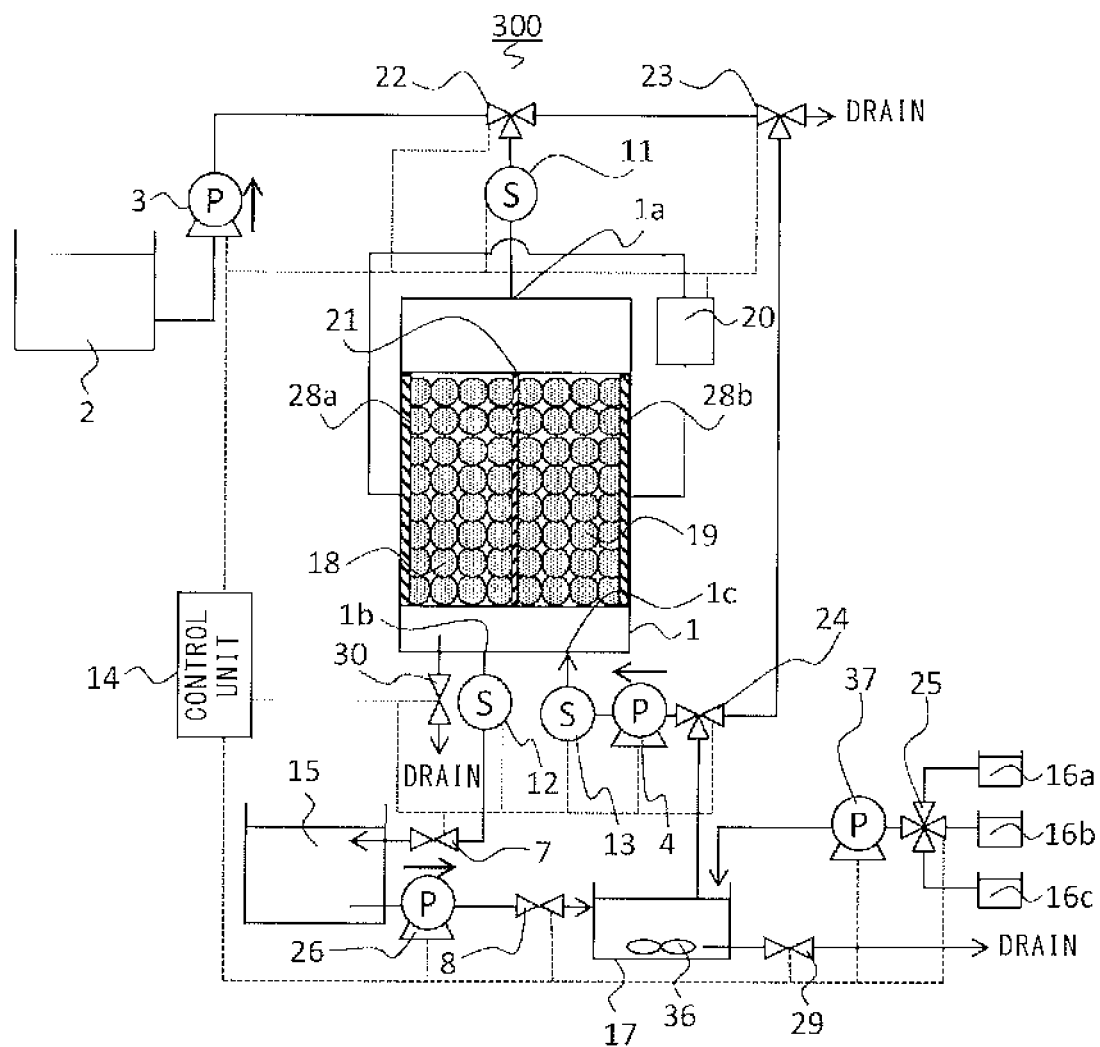
FIG. 6 is a configuration diagram of a water treatment apparatus according to embodiment 3 of the present invention.

Hereinafter, embodiment 3 of the present invention will be described with reference to FIG. 6. Parts that are the same as or correspond to those in FIG. 4 are denoted by the same reference characters, and the description thereof is omitted. Embodiment 3 is different from embodiment 2 in that plural types of additives are provided. FIG. 6 is a configuration diagram of a water treatment apparatus according to embodiment 3 of the present invention. In a water treatment apparatus 300, as in embodiment 2, the water treatment unit 1 is connected to the treated water tank 15 via the desalinated water measurement unit 12 and then the desalinated water sending valve 7. On the other hand, unlike embodiment 2, the water treatment unit 1 is not connected to the reverse washing water tank 17 via the desalinated water measurement unit 12 and then the desalinated water sending valve 8. The water treatment unit 1 is connected to the reverse washing water tank 17 via the treated water tank 15 which is connected to the reverse washing water tank 17 via a desalinated water sending pump 26 and then the desalinated water sending valve 8. The water treatment unit 1 is capable of drainage via a drain valve 30.

The reverse washing water tank 17 is connected to three additive storage tanks 16a, 16b, 16c via the additive supply pump 37 and a four-way valve 25. The additive storage tanks 16a, 16b, 16c store different types of additives (hereinafter, referred to as additive A, additive B, additive C). The four-way valve 25 allows the reverse washing water tank 17 to be connected to one of the three additive storage tanks 16a, 16b, 16c in accordance with an additive to be used. The additive supply pump 37 and the four-way valve 25 are connected to the control unit 14, and are controlled by the control unit 14 during execution of each processing step.

The other configurations are the same as in embodiment 2 and therefore the description thereof is omitted.

Next, operation will be described. The operation is the same as in embodiment 2 in that desalination of treatment target water is sequentially performed while a cycle of desalination of treatment target water in the water treatment unit 1 and washing of the water treatment unit 1 is repeated. In addition, the "reverse washing step" and the "washing method execution control" in embodiment 3 are the same as in embodiment 2 and therefore the description thereof is omitted. The "desalination step" and the "addition reverse washing step" will be described in detail.

In the addition reverse washing step, reverse washing by washing water in which the additive A, B, C stored in each additive storage tank 16a, 16b, 16c is added is defined as first reverse washing, second reverse washing, and third reverse washing, respectively, and the case of performing the addition reverse washing step in order of the first reverse washing, the second reverse washing, and then the third reverse washing will be described.

<Desalination Step>

In the desalination step, as in embodiment 2, first, the three-way valve 22 is opened in a direction from the raw water tank 2 to the water treatment unit 1, and the three-way valve 23 is closed. Also, the desalinated water sending valve 7 is opened. Next, the treatment target water supply pump 3 is activated to send the treatment target water in the raw water tank 2 so as to be supplied to the water treatment unit 1. The treatment target water is supplied through the upper inlet port 1a of the water treatment unit 1 into the water treatment unit 1, and then flows downward. In addition, DC voltage is applied to the first granular electrode member 18 and the second granular electrode member 19 via the pair of collectors 28a, 28b by the power supply unit 20, whereby ions contained in the treatment target water are adsorbed and removed by a Coulomb force to the first granular electrode member 18 and the second granular electrode member 19, and thus the treatment target water is desalinated. The desalinated treatment target water is discharged as desalinated water through the lower outlet port 1b of the water treatment unit 1 and flows through the desalinated water measurement unit 12 and the desalinated water sending valve 7 to the treated water tank 15. When a predetermined amount of the desalinated water has been supplied to the treated water tank 15, the desalinated water sending valve 8 is opened and the desalinated water sending pump 26 is activated to send the desalinated water from the treated water tank 15 to the reverse washing water tank 17 until the amount thereof reaches a prescribed amount.

The other matters are the same as in embodiment 1.

<Addition Reverse Washing Step>

In the first reverse washing, first, the four-way valve 25 is opened in a direction from the additive storage tank 16a to the reverse washing water tank 17 and the additive supply pump 37 is activated to add a predetermined amount of additive A to the washing water in the reverse washing water tank 17 from the additive storage tank 16a. Next, the stirrer 36 stirs and mixes the additive A and the washing water to generate additive-A containing washing water. Next, in a state in which the three-way valve 24 is opened in a direction from the reverse washing water tank 17 to the washing water measurement unit 13 and the water treatment unit 1, and the three-way valve 22 is opened in a direction from the water treatment unit 1 to the three-way valve 23, the washing water supply pump 4 is activated to inject the additive-A containing washing water in the reverse washing water tank 17 into the water treatment unit 1 in a direction from the lower washing water inlet port 1c to the upper inlet port 1a of the water treatment unit 1, i.e., the direction opposite to the flow of the treatment target water. At this time, until a predetermined amount of the washing water is stored in the water treatment unit 1, the three-way valve 23 is opened in a direction from the three-way valve 22 to the drain side so that the washing water flowing out from the inlet port 1a is drained.

After the predetermined amount of additive-A containing washing water is stored in the water treatment unit 1, the three-way valve 23 is opened in a direction from the three-way valve 22 to the three-way valve 24, and the three-way valve 24 is opened in a direction from the three-way valve 23 to the washing water measurement unit 13 and the water treatment unit 1. Thus, a circulation path for the additive-A containing washing water is formed, and the additive containing washing water is circulated by a driving force from the washing water supply pump 4. Washing of the water treatment unit 1 by the additive-A containing washing water is the same as the reverse washing in the addition reverse washing step in embodiment 2.

After the first reverse washing is finished, the drain valve 29 is opened so that the additive-A containing washing water is drained from the reverse washing water tank 17. After the additive-A containing washing water is drained, the desalinated water sending valve 8 is opened and the desalinated water sending pump 26 is activated to send the desalinated water from the treated water tank 15 to the reverse washing water tank 17. When a predetermined amount of the desalinated water has been sent to the reverse washing water tank 17, the desalinated water sending pump 26 is stopped and the desalinated water sending valve 8 is closed.

The four-way valve 25 is opened in a direction from the additive storage tank 16b to the reverse washing water tank 17, and the additive supply pump 37 is activated to add a predetermined amount of additive B to the washing water in the reverse washing water tank 17 from the additive storage tank 16b. Next, the stirrer 36 stirs and mixes the additive B and the washing water to generate additive-B containing washing water. Thereafter, the second reverse washing by the additive-B containing washing water is executed in the same manner as in case of the first reverse washing. After the second reverse washing is finished, similarly, the additive is switched from the additive B to the additive C and the third reverse washing is executed.

After the third reverse washing is finished, the washing water supply pump 4 is stopped, the desalinated water sending valve 7 is closed, and the drain valve 30 is opened. The three-way valve 22 is opened in a direction from the raw water tank 2 to the water treatment unit 1, and the treatment target water supply pump 3 is activated to send the treatment target water to the water treatment unit 1, so that the additive-C containing washing water remaining in the water treatment unit 1 is caused to flow out and is drained through the drain valve 30. After the flowing-out of the additive-C containing washing water is finished, the treatment target water supply pump 3 is stopped, and the drain valve 30 is closed, to finish the addition reverse washing step. The amount of treatment target water to be used for causing the additive containing washing water to flow out from the water treatment unit 1 is the same as that in embodiment 1.

It is noted that, in the case where, in light of the property of the desalinated water, there is no adverse effect even if the additive C remains in the water treatment unit 1, the operation of causing the additive-C containing washing water to flow out may be omitted.

Regarding the respective additives, the additive A used for the first reverse washing is an oxidizing agent having a property of removing biofilm, and the additive B used for the second reverse washing is an acid for removing scale such as calcium carbonate which ionizes under acidic condition. In addition, the additive C used for the third reverse washing is an alkali for removing scale such as silica which ionizes under basic condition. Desirably, it is preferable to use hydrogen peroxide, ozone, hypochlorous acid, or the like as the oxidizing agent, and use sulfuric acid, hydrochloric acid, or the like as the acid. In addition, it is preferable to use sodium hydroxide, sodium carbonate, sodium sesquicarbonate, sodium bicarbonate, or the like as the alkali.

In embodiment 3, the same effects as in embodiment 2 can be obtained.

In addition, a plurality of additive storage tanks storing different types of additives are provided, biofilm is removed by the first reverse washing using the oxidizing agent, scale such as calcium carbonate which ionizes under acidic condition is removed by the second reverse washing using the acid, and scale such as silica which ionizes under basic condition is removed by the third reverse washing using the alkali. In this way, the reverse washing is executed using the washing waters to which different additives are added, whereby biofilm and/or scale accumulated in the water treatment unit 1 can be removed efficiently and effectively.

Embodiment 4

Figure 7:
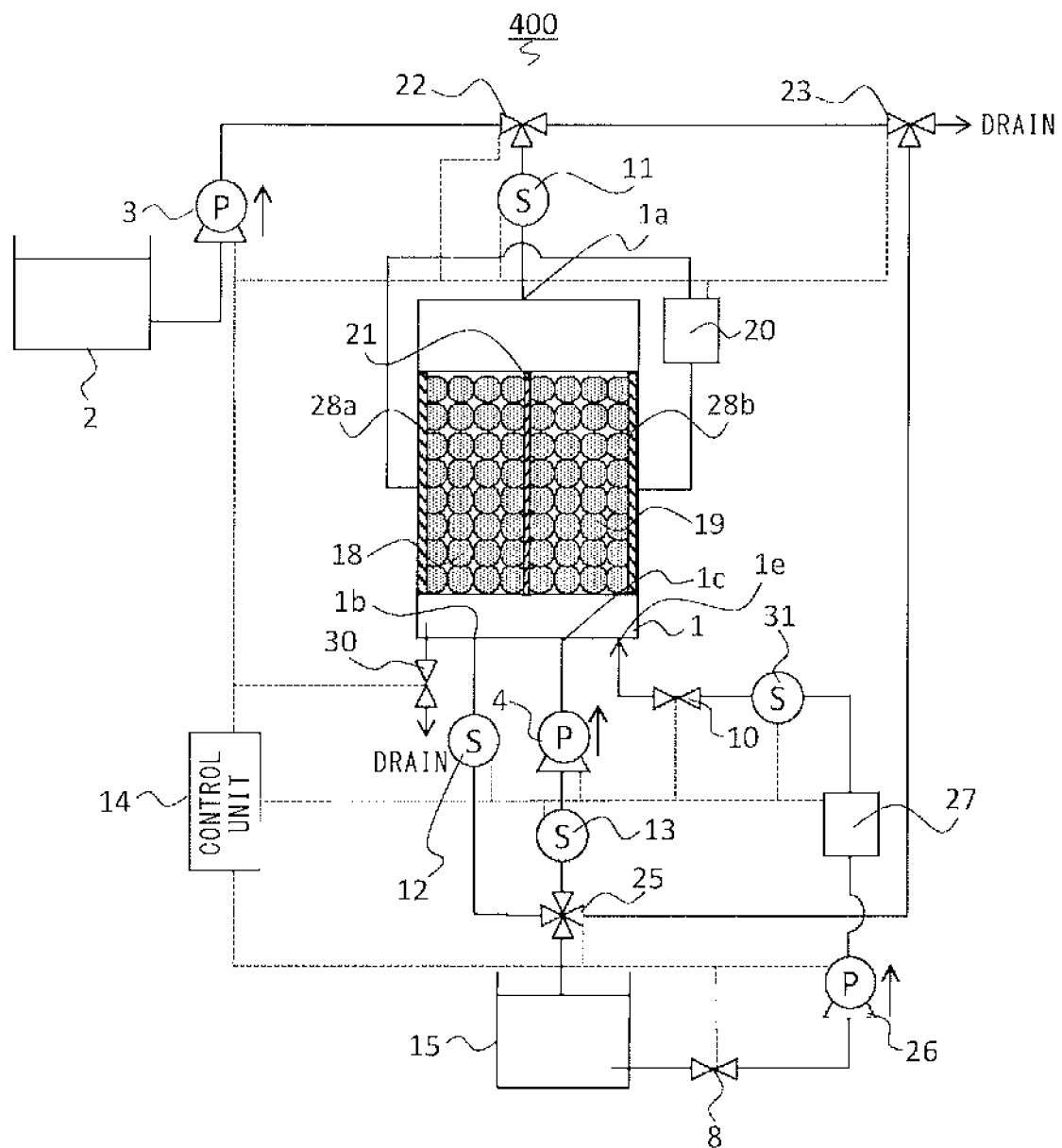
FIG. 7 is a configuration diagram of a water treatment apparatus according to embodiment 4 of the present invention.

Hereinafter, embodiment 4 of the present invention will be described with reference to FIG. 7. Parts that are the same as or correspond to those in FIG. 4 are denoted by the same reference characters, and the description thereof is omitted. Embodiment 4 is different from embodiment 2 in that an additive is directly injected into the water treatment unit 1. FIG. 7 is a configuration diagram of a water treatment apparatus according to embodiment 4 of the present invention. In a water treatment apparatus 400, the water treatment unit 1 is connected to the treated water tank 15 via the washing water supply pump 4, the washing water measurement unit 13, and the four-way valve 25. The water treatment unit 1 is capable of drainage via the drain valve 30. The water treatment apparatus 400 does not include the reverse washing water tank 17, and also, does not include the stirrer 36 and the drain valve 29.

The treated water tank 15 is connected to an additive generation unit 27 via the desalinated water sending valve 8 and the desalinated water sending pump 26. The additive generation unit 27 is for generating an additive and injecting the additive into the water treatment unit 1, and corresponds to the additive supply unit in embodiment 1. The additive generation unit 27 is connected to an additive injection port 1e of the water treatment unit 1 via an additive measurement unit 31 for measuring the additive concentration and the additive supply valve 10. The additive generation unit 27 and the additive measurement unit 31 are connected to the control unit 14, and are controlled by the control unit 14 during execution of each processing step. As the additive generation unit 27, an electrolyzer or the like that generates hypochlorous acid, hypochlorite, ozone, or hydrogen peroxide through electrolysis of desalinated water, e.g., an ozonizer for generating ozone from the air or oxygen gas supplied from outside, is used. Alternatively, ion-exchange resin, ion-exchange membrane, or the like may be used as the additive generation unit 27. In this case, it is possible to generate an acid or alkali from desalinated water. Although not shown, the additive generation unit 27 may be connected to the raw water tank 2, whereby an additive may be generated from the treatment target water.

The four-way valve 25 is connected also to the desalinated water measurement unit 12 and the three-way valve 23 as well as the washing water measurement unit 13 and the treated water tank 15, so that the desalinated water flowing out from the water treatment unit 1 can circulate via the desalinated water measurement unit 12, the four-way valve 25, the three-way valve 23, the three-way valve 22, and the treatment target water measurement unit 11.

The other configurations are the same as in embodiment 2 and therefore the description thereof is omitted.

Next, operation will be described. The operation is the same as in embodiment 1 in that desalination of treatment target water is sequentially performed while a cycle of desalination of treatment target water in the water treatment unit 1 and washing of the water treatment unit 1 is repeated. Hereinafter, the "desalination step", the "reverse washing step", and the "addition reverse washing step" will be described in detail. The "washing method execution control" is the same as in embodiment 1 and therefore the description thereof is omitted.

<Desalination Step>

In the desalination step, first, the three-way valve 22 is opened in a direction from the raw water tank 2 to the water treatment unit 1, and the three-way valve 23 is closed. In addition, the four-way valve 25 is opened in a direction from the desalinated water measurement unit 12 to the treated water tank 15. Next, the treatment target water supply pump 3 is activated to send the treatment target water in the raw water tank 2 so as to be supplied to the water treatment unit 1. The treatment target water is supplied through the upper inlet port 1a of the water treatment unit 1 into the water treatment unit 1, and then flows downward. In addition, DC voltage is applied to the first granular electrode member 18 and the second granular electrode member 19 via the pair of collectors 28a, 28b by the power supply unit 20, whereby ions contained in the treatment target water are adsorbed and removed by a Coulomb force to the first granular electrode member 18 and the second granular electrode member 19, and thus the treatment target water is desalinated. The desalinated treatment target water is discharged as desalinated water through the lower outlet port 1b of the water treatment unit 1 and flows through the desalinated water measurement unit 12 and the four-way valve 25 to the treated water tank 15.

The other matters are the same as in embodiment 2.

<Reverse Washing Step>

In the reverse washing step, first, in a state in which the four-way valve 25 is opened in a direction from the treated water tank 15 to the washing water measurement unit 13 and the water treatment unit 1, and the three-way valve 22 is opened in a direction from the water treatment unit 1 to the three-way valve 23, the washing water supply pump 4 is activated to inject, as washing water, the desalinated water in the treated water tank 15 into the water treatment unit 1 in a direction from the lower washing water inlet port 1c to the upper inlet port 1a of the water treatment unit 1, i.e., the direction opposite to the flow of the treatment target water. At this time, until a predetermined amount of the washing water is stored in the water treatment unit 1, the three-way valve 23 is opened in a direction from the three-way valve 22 to the drain side so that the washing water flowing out from the inlet port 1a is drained.

After the predetermined amount of desalinated water as washing water is stored in the water treatment unit 1, the three-way valve 23 is opened in a direction from the three-way valve 22 to the four-way valve 25, and the four-way valve 25 is opened in a direction from the three-way valve 23 to the washing water measurement unit 13 and the water treatment unit 1. Thus, a circulation path for the desalinated water as the washing water is formed, and the desalinated water circulates by a driving force from the washing water supply pump 4.

While the desalinated water as washing water is circulated, the electric conductivity of the desalinated water before injection into the water treatment unit 1 is measured by the washing water measurement unit 13 and the electric conductivity of the desalinated water after passing through the water treatment unit 1 is measured by the treatment target water measurement unit 11, and then a result of measurement by the treatment target water measurement unit 11 is compared with a result of measurement by the washing water measurement unit 13. As a result of comparison, if the result of the measurement by the treatment target water measurement unit 11 is 0 to 5 times, or desirably, 0.5 to 3 times the result of the measurement by the washing water measurement unit 13, the three-way valve 23 is switched to be opened in a direction from the three-way valve 22 to the drain side, to drain the circulating desalinated water. After the reverse washing in which the desalinated water is circulated has been executed 1 to 10 times, or desirably, 1 to 5 times, the four-way valve 25 is opened in a direction from the treated water tank 15 to the washing water measurement unit 13 and the water treatment unit 1, and thus the reverse washing by circulation is finished.

After the reverse washing by circulation is finished, while the desalinated water as washing water is being injected into the water treatment unit 1 from the treated water tank 15, the electric conductivity of the desalinated water before injection into the water treatment unit 1 is measured by the washing water measurement unit 13 and the electric conductivity of the desalinated water after passing through the water treatment unit 1 is measured by the treatment target water measurement unit 11, and then a result of the measurement by the treatment target water measurement unit 11 is compared with a result of the measurement by the washing water measurement unit 13. As a result of the comparison, if the result of the measurement by the treatment target water measurement unit 11 is 1 to 1.5 times, or desirably, 1 to 1.2 times the result of the measurement by the washing water measurement unit 13, it is considered that the washing has been sufficiently performed, and thus the washing water supply pump 4 is stopped and the washing water supply valve 9 is closed, whereby the reverse washing step is finished. If this condition is not satisfied, that is, if the result of the measurement by the treatment target water measurement unit 11 is greater than 1.5 times the result of the measurement by the washing water measurement unit 13, it is considered that biofilm and/or scale still remains in the water treatment unit 1 and thus the washing is insufficient. Therefore, the desalinated water is injected into the water treatment unit 1 and the reverse washing step is continued until the condition is satisfied.

The other matters are the same as in embodiment 2.

<Addition Reverse Washing Step>

In the addition reverse washing step, first, in a state in which the four-way valve 25 is opened in a direction from the treated water tank 15 to the washing water measurement unit 13 and the water treatment unit 1, and the three-way valve 22 is opened in a direction from the water treatment unit 1 to the three-way valve 23, the washing water supply pump 4 is activated to inject, as washing water, the desalinated water in the treated water tank 15 into the water treatment unit 1 in a direction from the lower washing water inlet port 1c to the upper inlet port 1a of the water treatment unit 1, i.e., the direction opposite to the flow of the treatment target water. At this time, until a predetermined amount of the washing water is stored in the water treatment unit 1, the three-way valve 23 is opened in a direction from the three-way valve 22 to the drain side so that the washing water flowing out from the inlet port 1a is drained.

After the predetermined amount of desalinated water as washing water is stored in the water treatment unit 1, the three-way valve 23 is opened in a direction from the three-way valve 22 to the four-way valve 25, and the four-way valve 25 is opened in a direction from the three-way valve 23 to the washing water measurement unit 13 and the water treatment unit 1. Thus, a circulation path for the desalinated water as the washing water is formed, and the desalinated water circulates by a driving force from the washing water supply pump 4.

While the desalinated water is circulated as described above, the additive supply valve 10 is opened and the additive generated by the additive generation unit 27 is injected through the additive injection port 1e into the water treatment unit 1. If the additive is used in a diluted state, the desalinated water sending valve 8 is opened and the desalinated water sending pump 26 is activated to send the desalinated water in the treated water tank 15 to the additive generation unit 27, whereby the additive is diluted by the desalinated water and the diluted additive is injected into the water treatment unit 1.

It is noted that the water treatment apparatus 400 does not include the drain valve 29 and therefore, regarding the flowing-out of the additive containing washing water which is performed at the end of the addition reverse washing step, the additive containing washing water is drained through the drain valve 30.

The other matters are the same as in embodiment 2.

In embodiment 4, the same effects as in embodiment 2 can be obtained.

In addition, since the additive is directly injected into the water treatment unit from the additive generation unit, the reverse washing water tank for mixing an additive with the washing water to generate additive containing washing water can be omitted. In addition, the time period for generating the additive containing washing water can be omitted and thus the time period of the addition reverse washing step is shortened, whereby the desalination can be efficiently performed.

It is noted that, since, in embodiment 4, plural types of additives can be generated by the additive generation unit, it is possible to execute the addition reverse washing step while switching the type of the additive for the first washing, the second washing, and the third washing as in embodiment 3.

Embodiment 5

Hereinafter, embodiment 5 of the present invention will be described with reference to FIG. 8. Parts that are the same as or correspond to those in FIG. 1 are denoted by the same reference characters, and the description thereof is omitted. Embodiment 5 is different from embodiment 1 in that a plurality of water treatment units are provided and connected in series. Hereinafter, one of the water treatment units is defined as an A-system, the other one is defined as a B-system, and the components in the A-system are denoted by adding "A" to the ends of their reference characters, and the components in the B-system are denoted by adding "B" to the ends of their reference characters.

Figure 8:
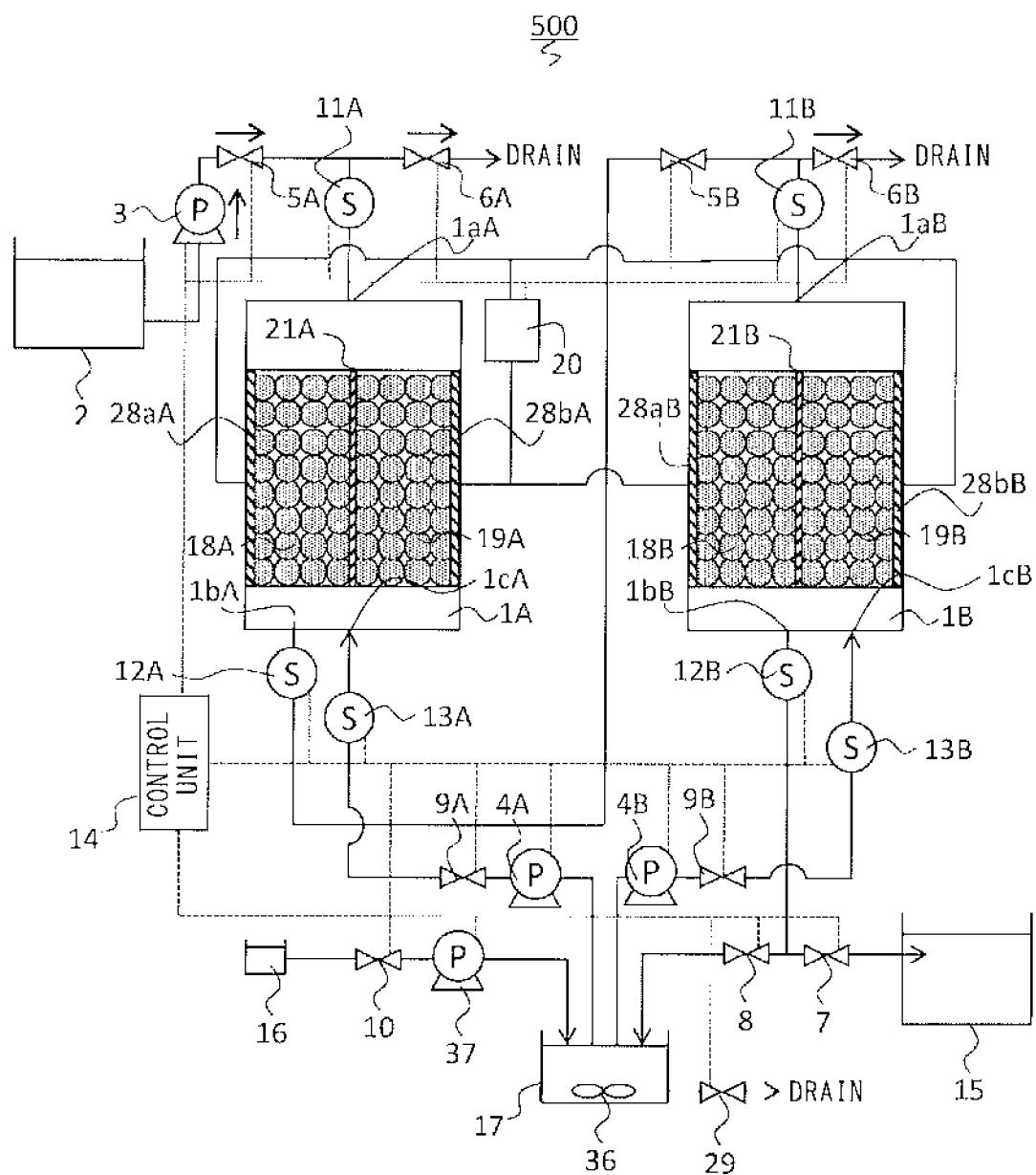
FIG. 8 is a configuration diagram of a water treatment apparatus according to embodiment 5 of the present invention.

FIG. 8 is a configuration diagram of a water treatment apparatus according to embodiment 5 of the present invention. A water treatment apparatus 500 includes a water treatment unit 1A and a water treatment unit 1B. The water treatment unit 1A has an inlet port 1aA through which treatment target water flows in, an outlet port 1bA through which desalinated water flows out, and a washing water inlet port 1cA through which washing water or additive containing washing water flows in at the time of reverse washing, and the water treatment unit 1A is connected via a treatment target water measurement unit 11A, the treatment target water supply valve 5, and then the treatment target water supply pump 3 to the raw water tank 2 for storing the treatment target water, and performs desalination for the treatment target water supplied from the raw water tank 2. The water treatment unit 1B has an inlet port 1aB through which treatment target water flows in, an outlet port 1bB through which desalinated water flows out, and a washing water inlet port 1cB through which washing water or additive containing washing water flows in at the time of reverse washing, and the water treatment unit 1B is connected via a desalinated water measurement unit 12A, a treatment target water supply valve 5B, and then a treatment target water measurement unit 11B to the water treatment unit 1A, and performs further desalination for the treatment target water that has undergone desalination by the water treatment unit 1A. The water treatment unit 1B is connected via a desalinated water measurement unit 12B and then the desalinated water sending valve 7 to the treated water tank 15 for storing the treatment target water that has undergone further desalination by the water treatment unit 1B, and also, the water treatment unit 1B is connected via the desalinated water measurement unit 12B and then the desalinated water sending valve 8 to the reverse washing water tank 17 for storing washing water for reverse washing.

The reverse washing water tank 17 is shared by the water treatment unit 1A and the water treatment unit 1B. The reverse washing water tank 17 is connected to the water treatment unit 1B also through a route passing a washing water supply pump 4B for supplying washing water to the water treatment unit 1B at the time of reverse washing, a washing water supply valve 9B, and then a washing water measurement unit 13B, and is connected to the water treatment unit 1A via a washing water supply pump 4A for supplying washing water to the water treatment unit 1A, a washing water supply valve 9A, and then a washing water measurement unit 13A.

Washing water supplied to the water treatment unit 1A and washing water supplied to the water treatment unit 1B can be drained via the treatment target water measurement unit 11A and the treatment target water measurement unit 11B, and then the drain valve 6A and the drain valve 6B, respectively, from the water treatment unit 1A and the water treatment unit 1B. In addition, the reverse washing water tank 17 is connected to the additive storage tank 16 via the additive supply valve 10 and then the additive supply pump 37, and the reverse washing water tank 17 is provided with the stirrer 36 for stirring and mixing an additive and washing water when the additive is supplied. Washing water in the reverse washing water tank 17 can be drained via the drain valve 29.

In the water treatment unit 1A, a pair of collectors 28aA, 28bA connected to the power supply unit 20 are provided at both ends, and between the pair of collectors 28aA, 28bA, a first granular electrode member 18A and a second granular electrode member 19A are provided so as to be opposed to each other and separated from each other by a separator 21A. A plurality of the first granular electrode members 18A and a plurality of the second granular electrode members 19A are provided. The first granular electrode members 18A or the second granular electrode members 19A are in contact with each other, but the first granular electrode member 18A and the second granular electrode member 19A are prevented from coming into contact with each other, by the separator 21A.

Similarly, in the water treatment unit 1B, a pair of collectors 28aB, 28bB connected to the power supply unit 20 are provided at both ends, and between the pair of collectors 28aB, 28bB, a first granular electrode member 18B and a second granular electrode member 19B are provided so as to be opposed to each other and separated from each other by a separator 21B. A plurality of the first granular electrode members 18B and a plurality of the second granular electrode members 19B are provided. The first granular electrode members 18B or the second granular electrode members 19B are in contact with each other, but the first granular electrode member 18B and the second granular electrode member 19B are prevented from coming into contact with each other, by the separator 21B.

The materials and functions of the collectors 28aA, 28bA, 28aB, 28bB, the first granular electrode members 18A, 18B, the second granular electrode members 19A, 19B, and the separators 21A, 21B are the same as those of the collectors 28a, 28b, the first granular electrode members 18, the second granular electrode members 19, and the separator 21 described in embodiment 1.

The treatment target water measurement unit 11A and the treatment target water measurement unit 11B, the desalinated water measurement unit 12A and the desalinated water measurement unit 12B, and the washing water measurement unit 13A and the washing water measurement unit 13B, which are respectively connected to the water treatment unit 1A and the water treatment unit 1B, are the same as the treatment target water measurement unit 11, the desalinated water measurement unit 12, and the washing water measurement unit 13 of embodiment 1.

The valves, the pumps, and the measurement units are connected to the control unit 14 as in embodiment 1, and are controlled by the control unit 14 during execution of each processing step.

Although two water treatment units are provided in embodiment 5, the number thereof is not limited thereto and three or more water treatment units may be provided.

Next, operation will be described. The operation is the same as in embodiment 1 in that desalination of treatment target water is sequentially performed while a cycle of desalination of treatment target water in the water treatment unit 1A and the water treatment unit 1B and washing of the water treatment unit 1A and the water treatment unit 1B is repeated. Hereinafter, the "desalination step", the "reverse washing step", and the "addition reverse washing step" will be described in detail.

<Desalination Step>

In the desalination step, first, the treatment target water supply valve 5A and the treatment target water supply valve 5B are opened, and the drain valve 6A and the drain valve 6B are closed. Next, the treatment target water supply pump 3 is activated to send the treatment target water in the raw water tank 2 so as to be supplied to the water treatment unit 1A. The treatment target water is supplied through the upper inlet port 1aA of the water treatment unit 1A into the water treatment unit 1A, and then flows downward. In addition, DC voltage is applied to the first granular electrode members 18A and the second granular electrode members 19A via the pair of collectors 28aA, 28bA by the power supply unit 20, and ions contained in the treatment target water are adsorbed and removed by a Coulomb force to the first granular electrode members 18A and the second granular electrode members 19A, whereby the treatment target water is desalinated. The desalinated treatment target water is discharged as desalinated water through the lower outlet port 1bA of the water treatment unit 1A, and passes through the desalinated water measurement unit 12A, the treatment target water supply valve 5B, and then the treatment target water measurement unit 11B so as to be supplied to the water treatment unit 1B through the inlet port 1aB. Also in the water treatment unit 1B, similarly, ions contained in the treatment target water that has undergone desalination by the water treatment unit 1A are adsorbed and removed to the first granular electrode members 18B and the second granular electrode members 19B, whereby further desalination is performed. The treatment target water that has undergone further desalination by the water treatment unit 1B is discharged through the lower outlet port 1bB of the water treatment unit 1B. Then, as in embodiment 1, the discharged water is sent to the reverse washing water tank 17 until a prescribed amount of the water is stored, and after the prescribed amount is reached, the discharged water is sent to the treated water tank 15. After a predetermined time has elapsed since the start of the desalination step, the treatment target water supply pump 3 is stopped, and the treatment target water supply valve 5A, the treatment target water supply valve 5B, and the desalinated water sending valve 7 are closed. In addition, application of DC voltage by the power supply unit 20 is stopped, whereby the desalination step is finished.

The other matters are the same as in embodiment 1.

<Washing Method Execution Control>

After the desalination step is finished, the control unit 14 executes execution control to determine whether to execute the reverse washing step or the addition reverse washing step, using the ion removal rate in the water treatment unit 1 as a determination index. Since the water treatment apparatus 500 of embodiment 5 includes two water treatment units 1A and 1B, the washing method execution control is performed for each of the water treatment unit 1A and the water treatment unit 1B. The washing method execution control for each water treatment unit is performed using the ion removal rate as a determination index, as in embodiment 1.

<Reverse Washing Step>

In the reverse washing step, first, in a state in which the drain valve 6A and the washing water supply valve 9A are opened and the treatment target water supply valve 5A is closed, the washing water supply pump 4A is activated to inject the washing water in the reverse washing water tank 17 into the water treatment unit 1A in a direction from the lower washing water inlet port 1cA to the upper inlet port 1aA of the water treatment unit 1A, i.e., the direction opposite to the flow of the treatment target water. In addition, in a state in which the drain valve 6B and the washing water supply valve 9B are opened and the treatment target water supply valve 5B is closed, the washing water supply pump 4B is activated to inject the washing water in the reverse washing water tank 17 into the water treatment unit 1B in the direction opposite to the flow of the treatment target water. The washing water injected into the water treatment unit 1A flows upward in the drawing and flows out through the inlet port 1aA to the upper side of the water treatment unit 1A, and thereafter, is drained through the drain valve 6A. The washing water injected into the water treatment unit 1B flows upward in the drawing and flows out through the inlet port 1aB to the upper side of the water treatment unit 1B, and thereafter, is drained through the drain valve 6B.

During execution of the reverse washing step, as in embodiment 1, the electric conductivities of the washing water before and after injection into the water treatment unit are measured and compared, whereby whether or not the reverse washing step can be finished is determined. In embodiment 5, the determination is performed for each of the water treatment unit 1A and the water treatment unit 1B, and unless the reverse washing step is finished in both of the A-system and the B-system, the process does not proceed to the desalination step.

The other matters are the same as in embodiment 1.

Also in embodiment 5, as in embodiments 2 to 4, a circulation path may be formed to execute reverse washing in which washing water is circulated.

<Addition Reverse Washing Step>

In the addition reverse washing step, first, the additive supply valve 10 is opened and the additive supply pump 37 is activated to add a predetermined amount of additive to the washing water in the reverse washing water tank 17 from the additive storage tank 16. Next, the stirrer 36 stirs and mixes the additive and the washing water to generate additive containing washing water. Thereafter, in the same manner as in the above reverse washing step, the additive containing washing water is injected into each of the water treatment unit 1A and the water treatment unit 1B.

After the additive containing washing water the amount of which is 2 to 10 times, or desirably, 3 to 5 times the volume of the first granular electrode members 18A and the second granular electrode members 19A is injected into the water treatment unit 1A, the washing water supply pump 4A is stopped and the washing water supply valve 9A is closed. In addition, after the additive containing washing water the amount of which is 2 to 10 times, or desirably, 3 to 5 times the volume of the first granular electrode members 18B and the second granular electrode members 19B is injected into the water treatment unit 1B, the washing water supply pump 4B is stopped and the washing water supply valve 9B is closed.

After the washing water supply pump 4A and the washing water supply pump 4B are stopped, in a state in which the desalinated water sending valve 7 is closed, the treatment target water supply valve 5A, the treatment target water supply valve 5B, the desalinated water sending valve 8, and the drain valve 29 are opened, and the treatment target water supply pump 3 is activated to send the treatment target water from the raw water tank 2 to the water treatment unit 1A and then the water treatment unit 1B, thereby causing the additive containing washing water remaining in the water treatment unit 1A and the water treatment unit 1B to flow out and be drained from the reverse washing water tank 17 through the drain valve 29. After the flowing-out of the additive containing washing water is finished, the treatment target water supply pump 3 is stopped and the treatment target water supply valve 5A, the treatment target water supply valve 5B, and the drain valve 29 are closed, whereby the addition reverse washing step is finished.

The other matters are the same as in embodiment 1. However, as in the reverse washing step, in embodiment 5, determination is performed for each of the water treatment unit 1A and the water treatment unit 1B, and unless the addition reverse washing step is finished in both of the A-system and the B-system, the process does not proceed to the desalination step.

Also in embodiment 5, as in embodiments 2 to 4, a circulation path may be formed to execute reverse washing in which additive containing washing water is circulated.

In embodiment 5, the same effects as in embodiment 1 can be obtained.

In addition, since a plurality of water treatment units are connected in series, the treatment target water can be desalinated to a further decreased ion concentration.

In addition, since the reverse washing water tank is shared among the plurality of water treatment units, one reverse washing water tank is enough and the entire apparatus can be made compact.

Embodiment 6

Figure 9:
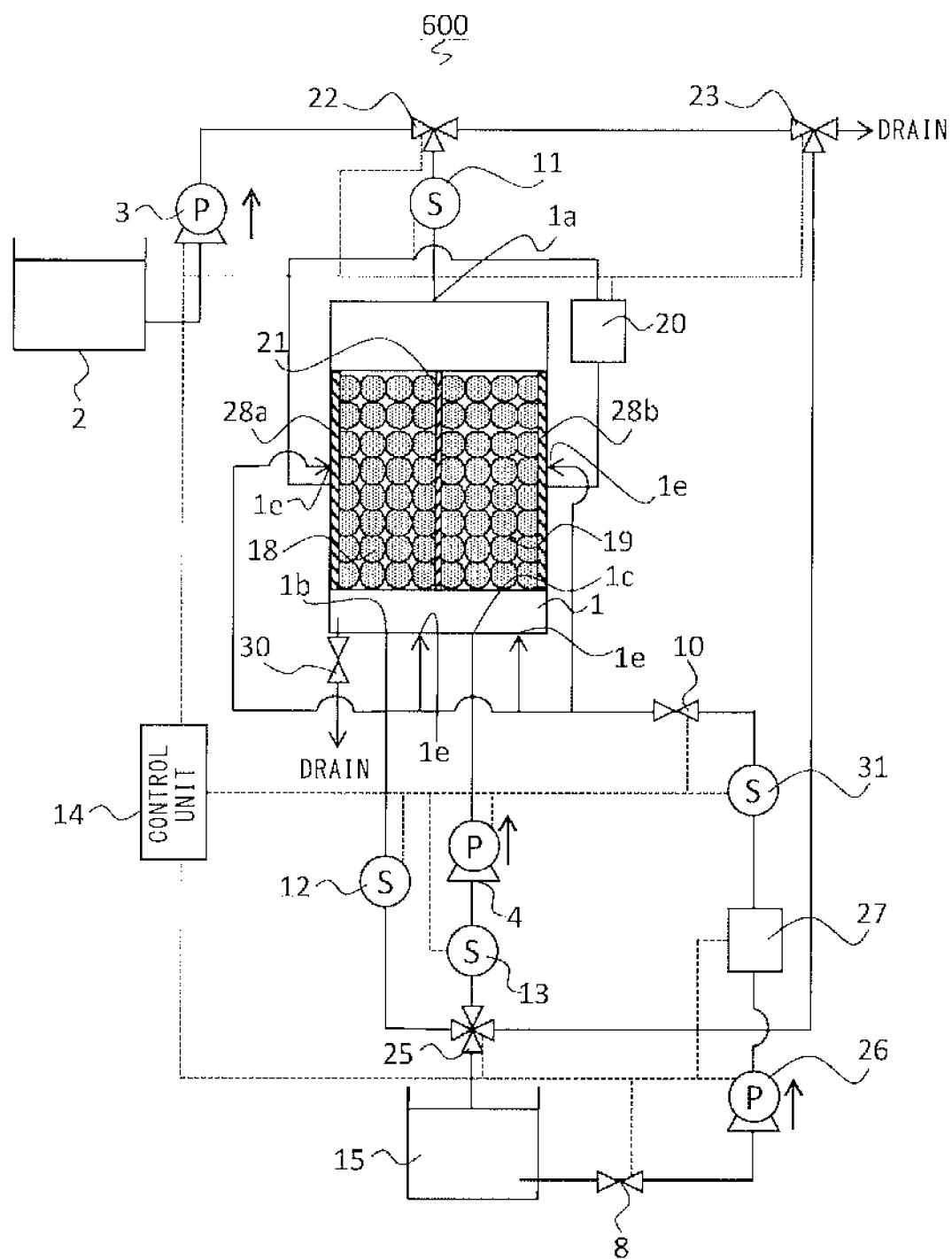
FIG. 9 is a configuration diagram of a water treatment apparatus according to embodiment 6 of the present invention.

Hereinafter, embodiment 6 of the present invention will be described with reference to FIG. 9. Parts that are the same as or correspond to those in FIG. 7 are denoted by the same reference characters, and the description thereof is omitted. Embodiment 6 is different from embodiment 4 in that additive injection ports 1e for injecting an additive are provided at a plurality of locations. FIG. 9 is a configuration diagram of a water treatment apparatus according to embodiment 6 of the present invention. In a water treatment apparatus 600, a plurality of additive injection ports 1e for injecting an additive from the additive generation unit 27 are provided at the lower part in the drawing, of the water treatment unit 1. In addition, additive injection ports 1e are provided also to the pair of collectors 28a, 28b.

The other matters are the same as in embodiment 4, and therefore the description thereof is omitted.

In embodiment 6, the same effects as in embodiment 4 can be obtained.

In addition, since the additive injection ports are provided at a plurality of locations of the water treatment unit, the additive is injected through the plurality of locations, whereby the additive containing washing water spreads faster over the entire granular electrode members, and thus the granular electrode members can be washed within a short time in the addition reverse washing step.

Embodiment 7

Figure 10:
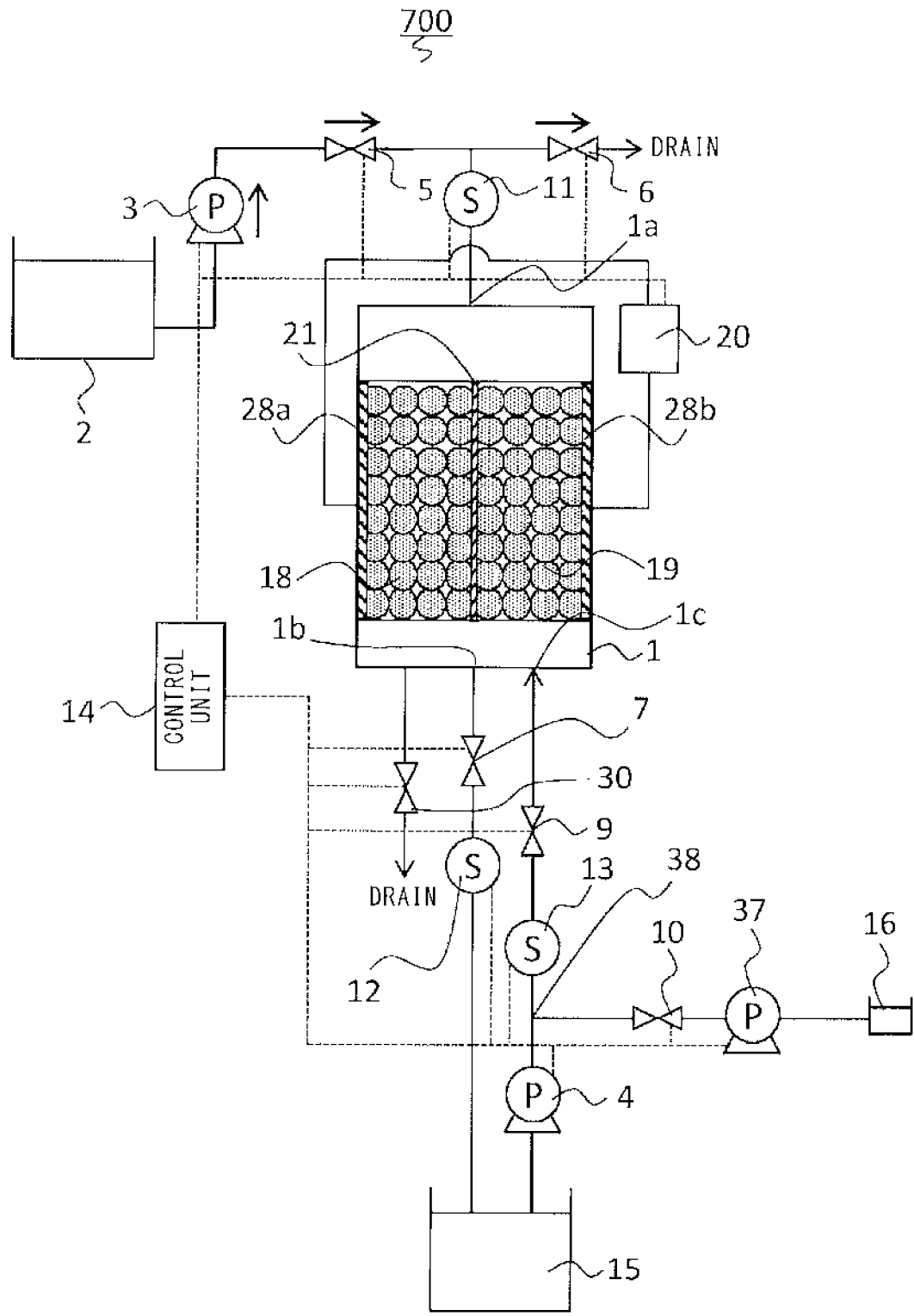
FIG. 10 is a configuration diagram of a water treatment apparatus according to embodiment 7 of the present invention.

Hereinafter, embodiment 7 of the present invention will be described with reference to FIG. 10. Parts that are the same as or correspond to those in FIG. 1 are denoted by the same reference characters, and the description thereof is omitted. Embodiment 7 is different from embodiment 1 in that washing water and an additive can be mixed in a pipe connecting the water treatment unit and the treated water tank. FIG. 10 is a configuration diagram of a water treatment apparatus according to embodiment 7 of the present invention. In a water treatment apparatus 700, the water treatment unit 1 which performs desalination for treatment target water is connected to the treated water tank 15 via the desalinated water sending valve 7 and then the desalinated water measurement unit 12, and is connected to the treated water tank 15 also through a route passing the washing water supply valve 9, the washing water measurement unit 13, and the washing water supply pump 4. The water treatment unit 1 is capable of drainage via the drain valve 30.

The additive storage tank 16 is connected via the additive supply pump 37 and then the additive supply valve 10 to an additive injection portion 38 provided to a pipe connecting the washing water measurement unit 13 and the washing water supply pump 4. The water treatment apparatus 700 does not include the reverse washing water tank 17, and also, does not include the desalinated water sending valve 8, the stirrer 36, and the drain valve 29.

The other matters are the same as in embodiment 1, and therefore the description thereof is omitted.

Next, operation will be described. The operation is the same as in embodiment 1 in that desalination of treatment target water is sequentially performed while a cycle of desalination of treatment target water in the water treatment unit 1 and washing of the water treatment unit 1 is repeated. Hereinafter, the "desalination step", the "reverse washing step", and the "addition reverse washing step" will be described in detail. The "washing method execution control" is the same as in embodiment 1, and therefore the description thereof is omitted.

<Desalination Step>

In the desalination step, first, the treatment target water supply valve 5 is opened and the drain valve 6 is closed. In addition, the desalinated water sending valve 7 is opened. Next, the treatment target water supply pump 3 is activated to send the treatment target water in the raw water tank 2 so as to be supplied to the water treatment unit 1. The treatment target water is supplied through the upper inlet port 1*a* of the water treatment unit 1 into the water treatment unit 1, and then flows downward. In addition, DC voltage is applied to the first granular electrode member 18 and the second granular electrode member 19 via the pair of collectors 28*a*, 28*b* by the power supply unit 20, and ions contained in the treatment target water are adsorbed and removed by a Coulomb force to the first granular electrode member 18 and the second granular electrode member 19, whereby the treatment target water is desalinated. The desalinated treatment target water is discharged as desalinated water through the lower outlet port 1*b* of the water treatment unit 1, and flows through the desalinated water sending valve 7 and the desalinated water measurement unit 12 to the treated water tank 15.

The other matters are the same as in embodiment 1.

<Reverse Washing Step>

In the reverse washing step, first, in a state in which the drain valve 6 and the washing water supply valve 9 are opened and the treatment target water supply valve 5 is closed, the washing water supply pump 4 is activated to inject, as washing water, the desalinated water in the treated water tank 15 into the water treatment unit 1 in a direction from the lower washing water inlet port 1*c* to the upper inlet port 1*a* of the water treatment unit 1, i.e., the direction opposite to the flow of the treatment target water.

The other matters are the same as in embodiment 1.

<Addition Reverse Washing Step>

In the addition reverse washing step, first, the additive supply valve 10 is opened and the additive supply pump 37 is activated to send the additive from the additive storage tank 16 to the additive injection portion 38 and inject the additive into the pipe connecting the washing water measurement unit 13 and the washing water supply pump 4. The desalinated water as the washing water flowing through the pipe is mixed with the additive while flowing to the water treatment unit 1, whereby additive containing washing water is generated. The generated additive containing washing water is injected into the water treatment unit 1 through the washing water inlet port 1*c*. Thereafter, the additive containing washing water flows upward and flows out to the upper side of the water treatment unit 1 through the inlet port 1*a*, and then is drained through the drain valve 6.

It is noted that the water treatment apparatus 700 does not include the drain valve 29 and therefore, regarding the flowing-out of the additive containing washing water which is performed at the end of the addition reverse washing step, the additive containing washing water is drained through the drain valve 30.

The other matters are the same as in embodiment 1.

In embodiment 7, the same effects as in embodiment 1 can be obtained.

In addition, since the additive is injected from the additive generation unit into the pipe connecting the water treatment unit and the treated water tank and the additive containing washing water is generated in the pipe, the reverse washing water tank can be omitted and thus the entire apparatus can be simplified.

In addition, since the additive is injected and mixed only to the desalinated water flowing from the treated water tank to the water treatment unit to generate the additive containing washing water, surplus additive containing washing water as in the case of mixing the additive to the washing water stored in the reverse washing water tank is not generated, and thus the generation amount of the additive containing washing water can be suppressed to the minimum necessary amount. As a result, the amount of desalinated water that can be recovered increases, whereby the recovery rate for desalinated water can be increased.

Embodiment 8

Figure 11:
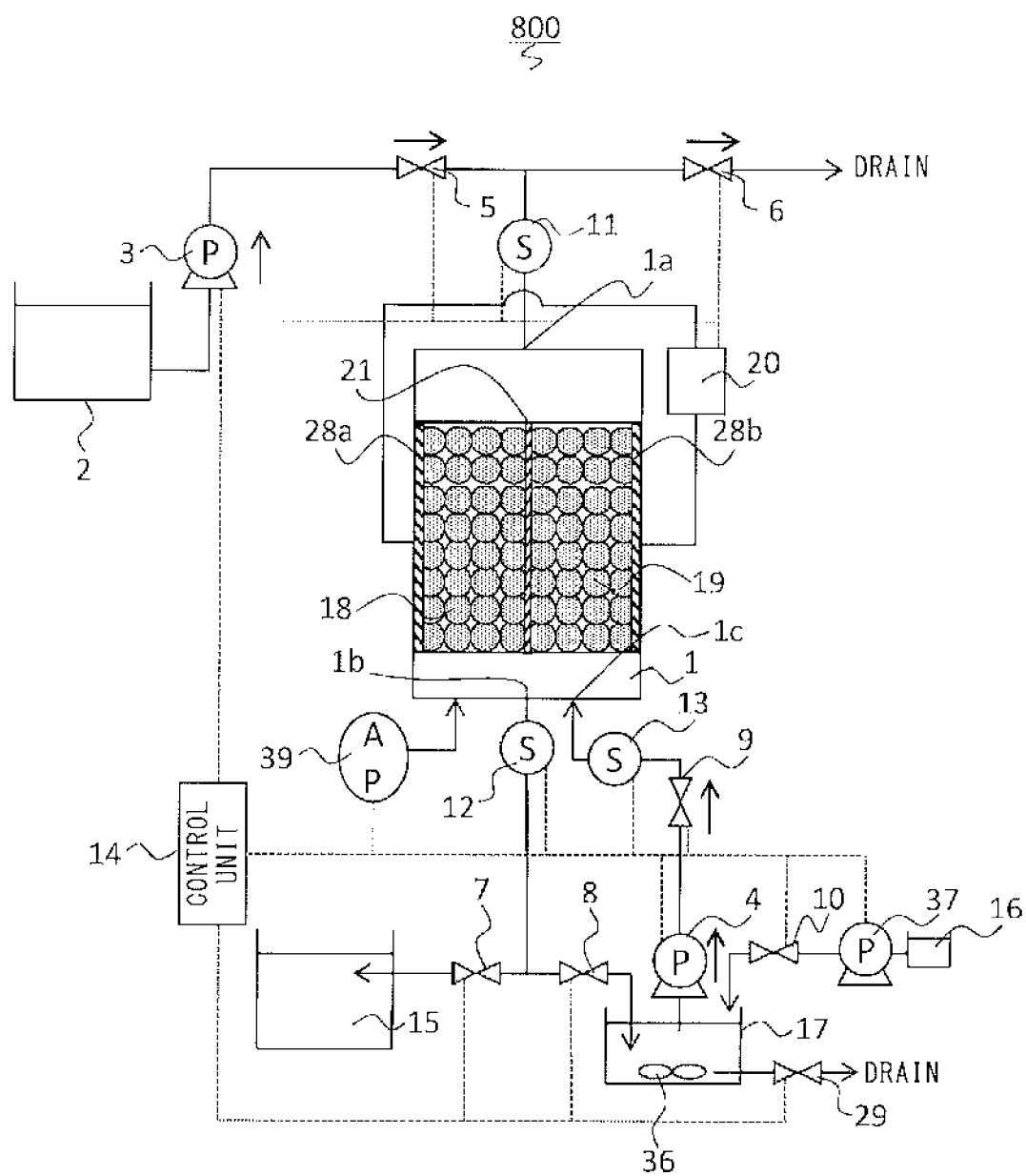
FIG. 11 is a configuration diagram of a water treatment apparatus according to embodiment 8 of the present invention.

Hereinafter, embodiment 8 of the present invention will be described with reference to FIG. 11. Parts that are the same as or correspond to those in FIG. 1 are denoted by the same reference characters, and the description thereof is omitted. Embodiment 8 is different from embodiment 1 in that air is injected into the water treatment unit in the reverse washing step and the addition reverse washing step. FIG. 11 is a configuration diagram of a water treatment apparatus according to embodiment 8 of the present invention. A water treatment apparatus 800 includes an air pump 39 for injecting air into the water treatment unit 1 from the lower side of the water treatment unit 1. The air pump 39 is connected to the control unit 14, and is controlled by the control unit 14 during execution of each processing step.

The other matters are the same as in embodiment 1, and therefore the description thereof is omitted.

Next, operation will be described. The operation is the same as in embodiment 1 in that desalination of treatment target water is sequentially performed while a cycle of desalination of treatment target water in the water treatment unit 1 and washing of the water treatment unit 1 is repeated. Hereinafter, the "reverse washing step" and the "addition reverse washing step" will be described in detail. The "desalination step" and the "washing method execution control" are the same as in embodiment 1, and therefore the description thereof is omitted.

<Reverse Washing Step>

In the reverse washing step, first, in a state in which the drain valve 6 and the washing water supply valve 9 are opened and the treatment target water supply valve 5 is closed, the washing water supply pump 4 is activated to inject the washing water in the reverse washing water tank 17 into the water treatment unit 1 in a direction from the lower washing water inlet port 1c to the upper inlet port 1a of the water treatment unit 1, i.e., the direction opposite to the flow of the treatment target water. After the washing water is injected into the water treatment unit 1 through the washing water inlet port 1c, the washing water flows upward and flows out to the upper side of the water treatment unit 1 through the inlet port 1a, and then is drained through the drain valve 6. At this time, the air pump 39 injects air into the water treatment unit 1 in a direction from the lower side to the upper side of the water treatment unit 1, i.e., the direction opposite to the flow of the treatment target water.

The air injected by the air pump 39 flows in the water treatment unit 1 together with the washing water. By the flow of the air, a shear force acts on the surfaces of the first granular electrode member 18 and the second granular electrode member 19, thereby removing biofilm and/or scale adhered to the surfaces of the granular electrode members. The flow speed of the air injected by the air pump 39 is 0.5 to 1.5 m/min, or desirably, 0.7 to 0.9 m/min, and the air injection time is 1 to 10 minutes, or desirably, 2 to 5 minutes. If the flow speed is too high, the shear force acting on the surfaces of the granular electrode members becomes excessive and thus the surfaces are worn out, so that the specific surface area is reduced, leading to decrease in capacitor. On the other hand, if the flow speed is too low, the effect of washing by air is reduced. In addition, if the injection time is too long, a time is taken for washing, leading to reduction of desalination efficiency. On the other hand, if the injection time is too short, the effect of washing by air is reduced.

The other matters are the same as in embodiment 1.

<Addition Reverse Washing Step>

In the addition reverse washing step, first, the additive supply valve 10 is opened and the additive supply pump 37 is activated to add a predetermined amount of additive to the washing water in the reverse washing water tank 17 from the additive storage tank 16. Next, the stirrer 36 stirs and mixes the additive and the washing water to generate additive containing washing water.

Next, in a state in which the drain valve 6 and the washing water supply valve 9 are opened and the treatment target water supply valve 5 is closed, the washing water supply pump 4 is activated to inject the additive containing washing water in the reverse washing water tank 17 into the water treatment unit 1 in a direction from the lower washing water inlet port 1c to the upper inlet port 1a of the water treatment unit 1, i.e., the direction opposite to the flow of the treatment target water. After the additive containing washing water is injected into the water treatment unit 1 through the washing water inlet port 1c, the additive containing washing water flows upward and flows out to the upper side of the water treatment unit 1 through the inlet port 1a, and then is drained through the drain valve 6. At this time, the air pump 39 injects air into the water treatment unit 1 in a direction from the lower side to the upper side in the drawing, i.e., the direction opposite to the flow of the treatment target water. The air injected by the air pump 39 flows in the water treatment unit 1 together with the additive containing washing water. By the flow of the air, a shear force acts on the surfaces of the first granular electrode member 18 and the second granular electrode member 19, thereby removing and injecting biofilm and/or scale adhered to the surfaces of the granular electrode members. The flow speed and the injection time for the air are the same as in the reverse washing step.

The other matters are the same as in embodiment 1.

In embodiment 8, the same effects as in embodiment 1 can be obtained.

In addition, air is injected into the water treatment unit in the reverse washing step and the addition reverse washing step, and by the flow of the air, a shear force acts on the surfaces of the granular electrode members, whereby a high washing effect can be obtained. In addition, a shear force applied between the granules of the granular electrode members increases, whereby a further increased washing effect can be obtained.

Embodiment 9

Figure 12:
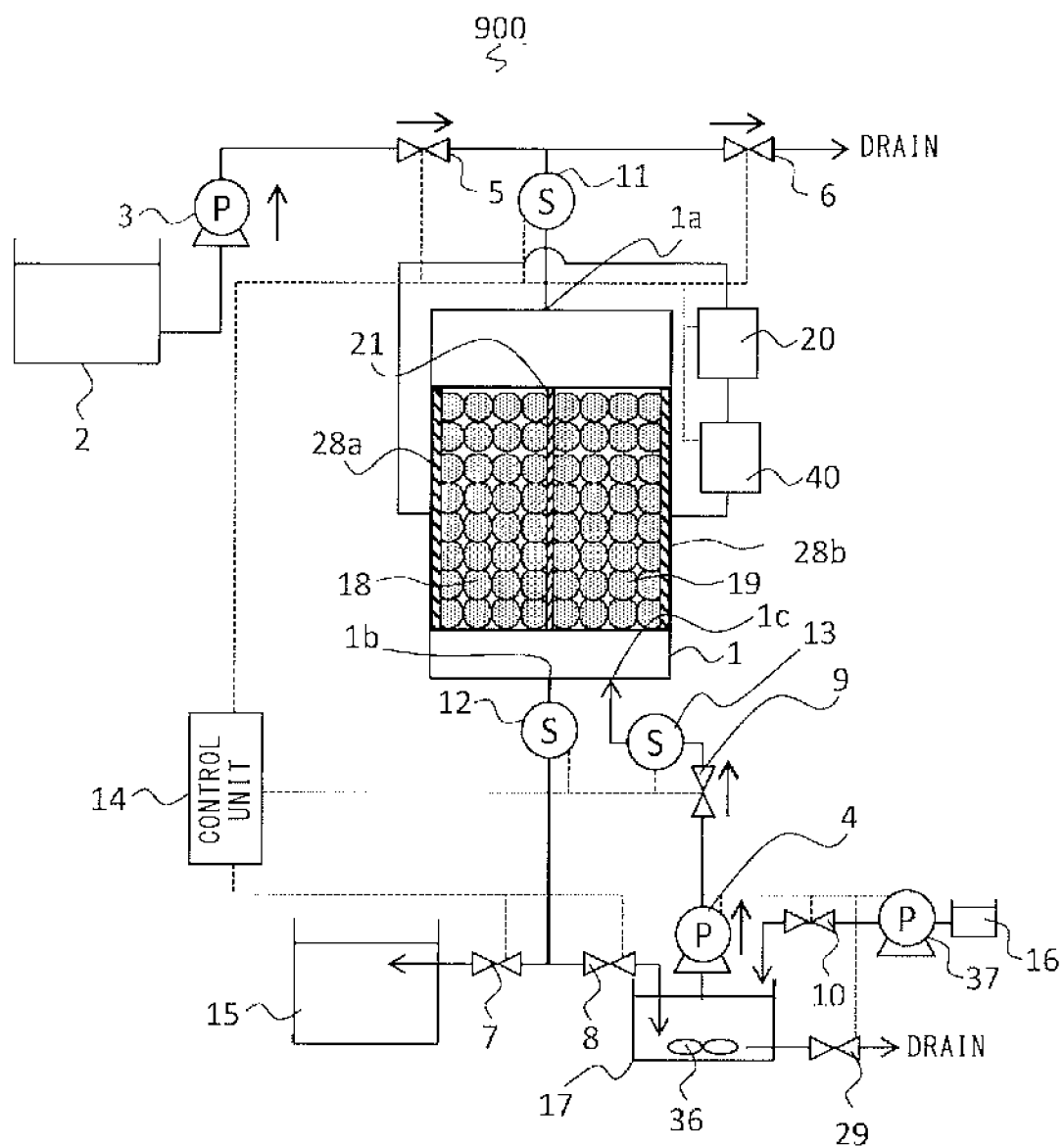
FIG. 12 is a configuration diagram of a water treatment apparatus according to embodiment 9 of the present invention.

Hereinafter, embodiment 9 of the present invention will be described with reference to FIG. 12. Parts that are the same as or correspond to those in FIG. 1 are denoted by the same reference characters, and the description thereof is omitted. Embodiment 9 is different from embodiment 1 in that temporal change in the electric conductivity of the treatment target water during desalination is used as a finish determination index for the desalination step. FIG. 12 is a configuration diagram of a water treatment apparatus according to embodiment 9 of the present invention. In a water treatment apparatus 900, the water treatment unit 1 is provided with a water treatment unit state measurement unit 40 for measuring the state in the water treatment unit 1. In embodiment 9, the water treatment unit state measurement unit 40 is an electric conductivity meter for measuring the electric conductivity of the treatment target water during desalination in the water treatment unit 1. The water treatment unit state measurement unit 40 is connected to the control unit 14, and is controlled by the control unit 14 during execution of each processing step.

The other matters are the same as in embodiment 1, and therefore the description thereof is omitted.

Next, operation will be described. The operation is the same as in embodiment 1 in that desalination of treatment target water is sequentially performed while a cycle of desalination of treatment target water in the water treatment unit 1 and washing of the water treatment unit 1 is repeated. Hereinafter, the "desalination step" will be described in detail. The "reverse washing step", the "addition reverse washing step", and the "washing method execution control" are the same as in embodiment 1, and therefore the description thereof is omitted.

<Desalination Step>

Control of the valves and the like and the flows of the treatment target water and the desalinated water in the desalination step are the same as in embodiment 1. The water treatment unit state measurement unit 40 measures the electric conductivity of treatment target water that is being subjected to desalination in the water treatment unit 1, at predetermined time intervals, during execution of the desalination step. A result of the measurement after x has elapsed since the start of the desalination step is defined as $A(x)$, and a result of the measurement after (x+y) has elapsed is defined as A(x+y). When A(x+y) has become 0.8 to 1.0 times, or desirably, 0.95 to 1.0 times A(x), the desalination step is finished. If the desalination step is finished when A(x+y) is smaller than 0.8 times A(x), the desalination step is finished in a state in which the desalination still can be performed, and thus the desalination is insufficient. On the other hand, if the desalination step is finished when A(x+y) is greater than 1.0 times A(x), ions have been adsorbed to a deep part of each granular electrode member and thus a time is required for washing. Therefore, the time periods of the washing step and the addition reverse washing step are prolonged, so that desalination efficiency is reduced. In addition, desalinated water needed for washing increases, and thus the recovery amount of the desalinated water decreases. It is noted that x is an optional value, and y is 1 to 15 minutes, or desirably, 1 to 10 minutes. If y is too great, the time period of the desalination step is prolonged, so that ions are adsorbed to a deep part of each granular electrode member and a time is required for washing. Thus, the time periods of the washing step and the addition reverse washing step are prolonged and desalination efficiency is reduced. In addition, the amount of desalinated water needed for washing increases, and thus the recovery amount of the desalinated water decreases. On the other hand, if y is too small, the desalination step is finished even though the electric conductivity temporarily decreases, leading to insufficient desalination.

In embodiment 9, the same effects as in embodiment 1 can be obtained.

In addition, since the electric conductivity of the treatment target water during desalination is used as the finish determination index for the desalination step, determination as to finish of the desalination step is performed while the ion concentration in the treatment target water is reflected therein. Since the ion concentration in the treatment target water directly relates to desalination performance of the water treatment unit, it is possible to perform more effective and efficient desalination while maximally using the desalination performance of the water treatment unit.

Although not shown, the configuration in which temporal change in the electric conductivity of the treatment target water during desalination is used as a finish determination index for the desalination step as in embodiment 9, is also applicable to embodiments 2 to 8.

Embodiment 10

Hereinafter, embodiment 10 of the present invention will be described with reference to FIG. 1. Embodiment 10 is different from embodiment 1 in that an execution period is used as a finish determination index for the reverse washing step and the addition reverse washing step. The other matters are the same as in embodiment 1, and therefore the description thereof is omitted. The "reverse washing step" and the "addition reverse washing step" will be described in detail.

<Reverse Washing Step>

Control of the valves and the like and the flow of washing water in the reverse washing step are the same as in embodiment 1. When the execution period of the reverse washing has reached 1 to 60 minutes, or desirably, 3 to 30 minutes since the start of the reverse washing, the reverse washing step is finished. If the execution period of the reverse washing step is too long, a time is taken for the washing, so that the amount of desalinated water that is recovered is decreased, leading to reduction in desalination efficiency. On the other hand, if the execution period of the reverse washing step is too short, each granular electrode member is not sufficiently washed, leading to reduction in the ion removal rate, and thus desalination efficiency in the next desalination step is reduced.

<Addition Reverse Washing Step>

Control of the valves and the like and the flows of the additive and the additive containing washing water in the addition reverse washing step are the same as in embodiment 1. When the execution period of the reverse washing has reached 1 to 60 minutes, or desirably, 3 to 30 minutes since the start of the reverse washing using additive containing washing water, the reverse washing using additive containing washing water is finished. If the time period of the reverse washing using additive containing washing water is too long, a time is taken for the washing and the amount of desalinated water that is recovered decreases, leading to reduction in desalination efficiency. On the other hand, the time period of the reverse washing using additive containing washing water is too short, each granular electrode member is not sufficiently washed and materials adhered to the electrode members remain, leading to reduction in the ion removal rate, and thus desalination efficiency in the next desalination step is reduced.

After the reverse washing using the additive containing washing water, flowing-out of the additive containing washing water from the water treatment unit 1 by the treatment target water is started, and then, when the execution period of the flowing-out has reached 1 to 30 minutes, or desirably, 1 to 15 minutes since the start of the flowing-out, the flowing-out of the additive containing washing water is finished. If the time period of the flowing-out of the additive containing washing water is too short, the additive containing washing water cannot be caused to sufficiently flow out from the water treatment unit 1. On the other hand, if the time period of the flowing-out of the additive containing washing water is too long, the treatment target water needed for causing the additive containing washing water to flow out from the water treatment unit 1 increases, leading to reduction in the recovery rate for the desalinated water. In addition, if the time period required for causing the additive containing washing water to flow out from the water treatment unit 1 is prolonged, the time period of the addition reverse washing step is prolonged, and thus the number of times of the desalination step decreases, leading to reduction in the recovery rate for the desalinated water.

In embodiment 10, the same effects as in embodiment 1 can be obtained.

In addition, since the execution period is used as a finish determination index in the reverse washing step and the addition reverse washing, all of the desalination step, the reverse washing step, and the addition reverse washing step can be controlled on the basis of time, whereby operation of the water treatment apparatus can be simplified.

The configuration in which the execution period is used as a finish determination index in the reverse washing step and the addition reverse washing as in embodiment 10, is also applicable to embodiments 2 to 9.

Embodiment 11

Hereinafter, embodiment 11 of the present invention will be described with reference to FIG. 1. Embodiment 11 is different from embodiment 1 in that the ion concentration of the removal target ion is used as a determination index in the washing method execution control. In embodiment 11, a desalinated water ion concentration measurement unit (not shown) for measuring the ion concentration of the removal target ion in the desalinated water is connected to the water treatment unit 1. As the desalinated water ion concentration measurement unit (not shown), an absorption photometer for measuring the ultraviolet absorbance or an ion selective electrode is used. Examples of the removal target ion include chloride ion, sodium ion, calcium ion, magnesium ion, potassium ion, sulfuric acid ion, and nitrate ion.

The other matters are the same as in embodiment 1, and therefore the description thereof is omitted. The "washing method execution control" will be described in detail.

<Washing Method Execution Control>

First, the control unit 14 acquires the removal target ion concentration in the desalinated water from the desalinated water ion concentration measurement unit (not shown) and stores the removal target ion concentration into the storage unit (not shown). Next, the control unit 14 reads, from the storage unit (not shown), the greater one (hereinafter, referred to as "reference removal target ion concentration") of the removal target ion concentration at the time when the first-time desalination step is finished after the water treatment apparatus 100 has been activated, and the removal target ion concentration at the time when the first-time desalination step is finished after the previous addition reverse washing step has been executed, and compares the reference removal target ion concentration with the present removal target ion concentration. If the present removal target ion concentration is 1 to 2 times, or desirably, 1 to 1.5 times the reference removal target ion concentration, the desalination performance of the water treatment unit 1 has been reduced, and therefore the control unit 14 determines to execute the addition reverse washing step. If the present removal target ion concentration is smaller than 1 times the reference removal target ion concentration, the desalination performance of the water treatment unit 1 has not been reduced and it is not necessary to execute the addition reverse washing. Therefore, the control unit 14 determines to execute the reverse washing step. If the present removal target ion concentration is greater than 2 times, or desirably, 1.5 times the reference removal target ion concentration, the desalination performance has been significantly reduced and therefore the control unit 14 determines that it is difficult to restore the desalination performance by the addition reverse washing step. In such a case, for example, the control unit 14 causes a display unit (not shown) to display an alarm indication for notification that it is necessary to replace the first granular electrode member 18 and the second granular electrode member 19, thereby prompting a user to replace the first granular electrode member 18 and the second granular electrode member 19.

In embodiment 11, the same effects as in embodiment 1 can be obtained.

In addition, by using the ion concentration of the removal target ion as a determination index in the washing method execution control, it is possible to determine whether to execute the reverse washing step or the addition reverse washing in accordance with the ion concentration of an ion that is a main removal target. Therefore, a specific ion can be removed efficiently.

The configuration in which the ion concentration of the removal target ion is used as a determination index in the washing method execution control as in embodiment 11, is also applicable to embodiments 2 to 10.

Embodiment 12

Hereinafter, embodiment 12 of the present invention will be described with reference to FIG. 1. Embodiment 12 is different from embodiment 1 in that hardness is used as a determination index in the washing method execution control. In embodiment 12, a desalinated water hardness measurement unit (not shown) for measuring the hardness of desalinated water is connected to the water treatment unit 1. As the desalinated water hardness measurement unit (not shown), a hardness meter or a hardness sensor is used.

The other matters are the same as in embodiment 1, and therefore the description thereof is omitted. The "washing method execution control" will be described in detail.

<Washing Method Execution Control>

First, the control unit 14 acquires the hardness of desalinated water from the desalinated water hardness measurement unit (not shown) and stores the hardness into the storage unit (not shown). Next, the control unit 14 reads, from the storage unit (not shown), the greater one (hereinafter, referred to as "reference hardness") of the hardness of desalinated water at the time when the first-time desalination step is finished after the water treatment apparatus 100 has been activated, and the hardness of desalinated water at the time when the first-time desalination step is finished after the previous addition reverse washing step has been executed, and compares the reference hardness with the present hardness of the desalinated water. If the present hardness of the desalinated water is 1 to 2 times, or desirably, 1 to 1.5 times the reference hardness, the desalination performance of the water treatment unit 1 has been reduced, and therefore the control unit 14 determines to execute the addition reverse washing step. If the present hardness of the desalinated water is smaller than 1 times the reference hardness, the desalination performance of the water treatment unit 1 has not been reduced and it is not necessary to execute the addition reverse washing. Therefore, the control unit 14 determines to execute the reverse washing step. If the present hardness of the desalinated water is greater than 2 times, or desirably, 1.5 times the reference hardness, the desalination performance has been significantly reduced, and therefore the control unit 14 determines that it is difficult to restore the desalination performance by the addition reverse washing step. In such a case, for example, the control unit 14 causes a display unit (not shown) to display an alarm indication for notification that it is necessary to replace the first granular electrode member 18 and the second granular electrode member 19, thereby prompting a user to replace the first granular electrode member 18 and the second granular electrode member 19.

In embodiment 12, the same effects as in embodiment 1 can be obtained.

In addition, by using the hardness as a determination index in the washing method execution control, it is possible to measure the ion concentration of calcium ion, magnesium ion, or the like which is a cause of generation of scale which hampers stable desalination. Therefore, while the possibility of adhesion of scale is grasped, the addition reverse washing step can be executed at an effective timing.

The configuration in which the hardness is used as a determination index in the washing method execution control as in embodiment 12, is also applicable to embodiments 2 to 10.

Embodiment 13

Hereinafter, embodiment 13 of the present invention will be described with reference to FIG. 12. Embodiment 13 is different from embodiment 9 in that the current value of current flowing through the water treatment unit during execution of the desalination step is used as a determination index in the washing method execution control. Embodiment 13 uses a phenomenon in which, in electric desalination technology using electrical double layer capacitor technology, desalination performance is reduced when the capacitances of the first granular electrode member and the second granular electrode member in the water treatment unit are reduced due to adhesion of scale and/or biofilm, and the reduction of the capacitances is detected on the basis of measurement of current flowing through the water treatment unit during desalination. In embodiment 13, the water treatment unit state measurement unit 40 is a current meter for measuring the value of current flowing through the water treatment unit 1.

The other matters are the same as in embodiment 1, and therefore the description thereof is omitted. The "desalination step" and the "washing method execution control" will be described in detail.

<Desalination Step>

The control unit 14 acquires the current value of current flowing through the water treatment unit 1 at the start of the desalination step, from the water treatment unit state measurement unit 40 which is a current meter, and stores the current value into the storage unit (not shown). Control of the valves and the like and the flows of treatment target water and desalinated water are the same as in embodiment 1.

<Washing Method Execution Control>

The control unit 14 reads, from the storage unit (not shown), the greater one (hereinafter, referred to as "reference current value") of the current value of current flowing through the water treatment unit at the time when the first-time desalination step is finished after the water treatment apparatus 900 has been activated, and the current value at the time when the first-time desalination step is finished after the previous addition reverse washing step has been executed, and compares the reference current value with the present current value. If the present current value is smaller than 0.5 to 1.0 times, or desirably, 0.7 to 0.9 times the reference current value, the current flowing through the water treatment unit 1 has been reduced and thus desalination performance of the water treatment unit 1 has been reduced. Therefore, the control unit 14 determines to execute the addition reverse washing step. If the present current value is equal to or greater than 1.0 times, or desirably, 0.9 times the reference current value, the ion removal rate of the water treatment unit 1 has not been reduced or has been slightly reduced and thus it is not necessary to execute the addition reverse washing. Therefore, the control unit 14 determines to execute the reverse washing step. If the present current value is smaller than 0.5 times, or desirably, 0.7 times the reference current value, the desalination performance has been significantly reduced and therefore the control unit 14 determines that it is difficult to restore the desalination performance by the addition reverse washing step. In such a case, for example, the control unit 14 causes a display unit (not shown) to display an alarm indication for notification that it is necessary to replace the first granular electrode member 18 and the second granular electrode member 19, thereby prompting a user to replace the first granular electrode member 18 and the second granular electrode member 19.

Although the current value of current flowing through the water treatment unit 1 at the start of the desalination step is used as a determination index for the washing method execution control in embodiment 13, the current value at the time when the desalination step is finished or the integral value of the current value during execution of the desalination step may be used as the determination index.

In embodiment 13, the same effects as in embodiment 1 can be obtained.

In addition, since the current value of current flowing through the water treatment unit during execution of the desalination step is used as a determination index in the washing method execution control, the determination index is less likely to be influenced by contamination of treatment target water or desalinated water and thus it is possible to perform appropriate determination in the washing method execution control.

In addition, since measurement of the current value is easy and can be performed stably, the water treatment unit state measurement unit can be simplified.

Although not shown, the configuration in which the current value of current flowing through the water treatment unit during the desalination step is used as a determination index in the washing method execution control as in embodiment 13, is also applicable to embodiments 2 to 10.

Embodiment 14

Hereinafter, embodiment 14 of the present invention will be described with reference to FIG. 12. Embodiment 14 is different from embodiment 9 in that the voltage value between both ends of the water treatment unit at the time when the desalination step is finished and voltage drop thereof at the time of discharging after the desalination step is finished, are used as determination indices in the washing method execution control. Embodiment 14 uses a phenomenon in which, in electric desalination technology using electrical double layer capacitor technology, when the capacitances of the first granular electrode member and the second granular electrode member in the water treatment unit are reduced due to adhesion of scale and/or biofilm, desalination performance is reduced, and when the internal resistance in the water treatment unit is increased due to adhesion of scale and/or biofilm, desalination performance is reduced and the internal resistance is increased. The reduction in the capacitances is detected on the basis of measurement of the voltage value between both ends of the water treatment unit at the time when the desalination step is finished, and the increase in the internal resistance is detected on the basis of measurement of voltage drop at the time of discharging after the desalination step. In embodiment 14, the water treatment unit state measurement unit 40 is a voltage meter for measuring the voltage value between both ends of the water treatment unit 1, i.e., between the pair of collectors 28a, 28b.

The other matters are the same as in embodiment 1, and therefore the description thereof is omitted. The "desalination step" and the "washing method execution control" will be described in detail.

<Desalination Step>

The control unit 14 acquires the voltage value between both ends of the water treatment unit 1 at the time when the desalination step is finished and voltage drop thereof at the time of discharging after the desalination step, from the water treatment unit state measurement unit 40 which is a voltage meter, and stores the voltage value and voltage drop into the storage unit (not shown). Control of the valves and the like and the flows of the treatment target water and the desalinated water are the same as in embodiment 1.

<Washing Method Execution Control>

The control unit 14 reads, from the storage unit (not shown), the greater one (hereinafter, referred to as "reference voltage value") of the voltage value between both ends of the water treatment unit 1 at the time when the first-time desalination step is finished after the water treatment apparatus 900 has been activated, and the voltage value at the time when the first-time desalination step is finished after the previous addition reverse washing step has been executed, and the smaller one (hereinafter, referred to as "reference voltage drop") of the voltage drop between the both ends of the water treatment unit 1 at the time of discharging immediately after the first-time desalination step is finished after activation of the water treatment apparatus 900, and the voltage drop at the time of discharging immediately after the first-time desalination step is finished after the previous execution of the addition reverse washing step. Then, the control unit 14 compares the reference voltage value and the reference voltage drop with the present voltage value and the present voltage drop, respectively. If the present voltage value is smaller than 0.5 to 1.0 times, or desirably, 0.7 to 0.9 times the reference current value, or if the present voltage drop is 1 to 5 times, or desirably, 1 to 2 times the reference voltage drop, biofilm and/or scale has been adhered to the first granular electrode member 18 and the second granular electrode member 19 and thus desalination performance of the water treatment unit 1 has been reduced. Therefore, the control unit 14 determines to execute the addition reverse washing step.

In embodiment 14, the same effects as in embodiment 1 can be obtained.

In addition, in the washing method execution control, since the voltage value between both ends of the water treatment unit at the time when the desalination step is finished and voltage drop thereof at the time of discharging after the desalination step is finished are used as determination indices in the washing method execution control, the determination indices are less likely to be influenced by contamination of treatment target water or desalinated water and thus it is possible to perform appropriate determination in the washing method execution control.

In addition, since measurement of the voltage value is easy and can be performed stably, the water treatment unit state measurement unit can be simplified.

Although not shown, the configuration in which the voltage value between both ends of the water treatment unit at the time when the desalination step is finished and voltage drop at the time of discharging after the desalination step is finished are used as determination indices in the washing method execution control as in embodiment 14, is also applicable to embodiments 2 to 10.

Embodiment 15

Hereinafter, embodiment 15 of the present invention will be described with reference to FIG. 1. Embodiment 15 is different from embodiment 1 in that pressure loss in the water treatment unit at the time when the desalination step is finished is used as a determination index in the washing method execution control. Embodiment 15 uses a phenomenon in which, in electric desalination technology using electrical double layer capacitor technology, while the desalination step is repeated, accumulation of biofilm and/or scale and contraction of the granular electrode members due to wearing occur and thus their surface areas are reduced, and the capacitances are reduced, whereby desalination performance is reduced and the occlusion degree of the first granular electrode member and the second granular electrode member is increased. Increase in the occlusion degree is detected on the basis of measurement of pressure loss. In embodiment 15, the treatment target water measurement unit 11 and the desalinated water measurement unit 12 include pressure meters for measuring the pressures of treatment target water and desalinated water, respectively.

The other matters are the same as in embodiment 1, and therefore the description thereof is omitted. The "desalination step" and the "washing method execution control" will be described in detail.

<Desalination Step>

The control unit 14 acquires the pressures of treatment target water flowing into the water treatment unit 1 and desalinated water flowing out from the water treatment unit 1, from the treatment target water measurement unit 11 and the desalinated water measurement unit 12, when the desalination step is finished, and then the control unit 14 calculates pressure loss in the water treatment unit 1 and stores the pressure loss into the storage unit (not shown). Control of the valves and the like and the flows of the treatment target water and the desalinated water are the same as in embodiment 1.

<Washing Method Execution Control>

The control unit 14 reads, from the storage unit (not shown), the greater one (hereinafter, referred to as "reference pressure loss") of the pressure loss in the water treatment unit 1 at the time when the first-time desalination step is finished after the water treatment apparatus 100 has been activated, and the pressure loss at the time when the first-time desalination step is finished after the previous addition reverse washing step has been executed, and compares the reference pressure loss with the present pressure loss. If the present pressure loss is 1 to 5 times, or desirably, 1.5 to 3 times the reference pressure loss, biofilm and/or scale has been accumulated and the first granular electrode member 18 and the second granular electrode member 19 have contracted, whereby desalination performance has been reduced. Therefore, the control unit 14 determines to execute the addition reverse washing step. If the present pressure loss is smaller than 1 times, or desirably, 1.5 times the reference pressure loss, the ion removal rate of the water treatment unit 1 has not been reduced or has been slightly reduced and thus it is not necessary to execute the addition reverse washing. Therefore, the control unit 14 determines to execute the reverse washing step. If the present pressure loss is 5 times, or desirably, 3 times the reference pressure loss, desalination performance has been significantly reduced and therefore the control unit 14 determines that it is difficult to restore desalination performance by the addition reverse washing step. In such a case, for example, the control unit 14 causes a display unit (not shown) to display an alarm indication for notification that it is necessary to replace the first granular electrode member 18 and the second granular electrode member 19, thereby prompting a user to replace the first granular electrode member 18 and the second granular electrode member 19.

In embodiment 15, the same effects as in embodiment 1 can be obtained.

In addition, in the washing method execution control, since pressure loss in the water treatment unit at the time when the desalination step is finished is used as a determination index in the washing method execution control, the determination index is less likely to be influenced by contamination of treatment target water or desalinated water, and therefore it is possible to comprehensively and easily grasp increase in the occlusion degree of the first granular electrode member and the second granular electrode member. Thus, it is possible to easily perform appropriate determination in the washing method execution control.

Although not shown, the configuration in which pressure loss in the water treatment unit at the time when the desalination step is finished is used as a determination index in the washing method execution control as in embodiment 15, is also applicable to embodiments 2 to 10.

Embodiment 16

Figure 13:
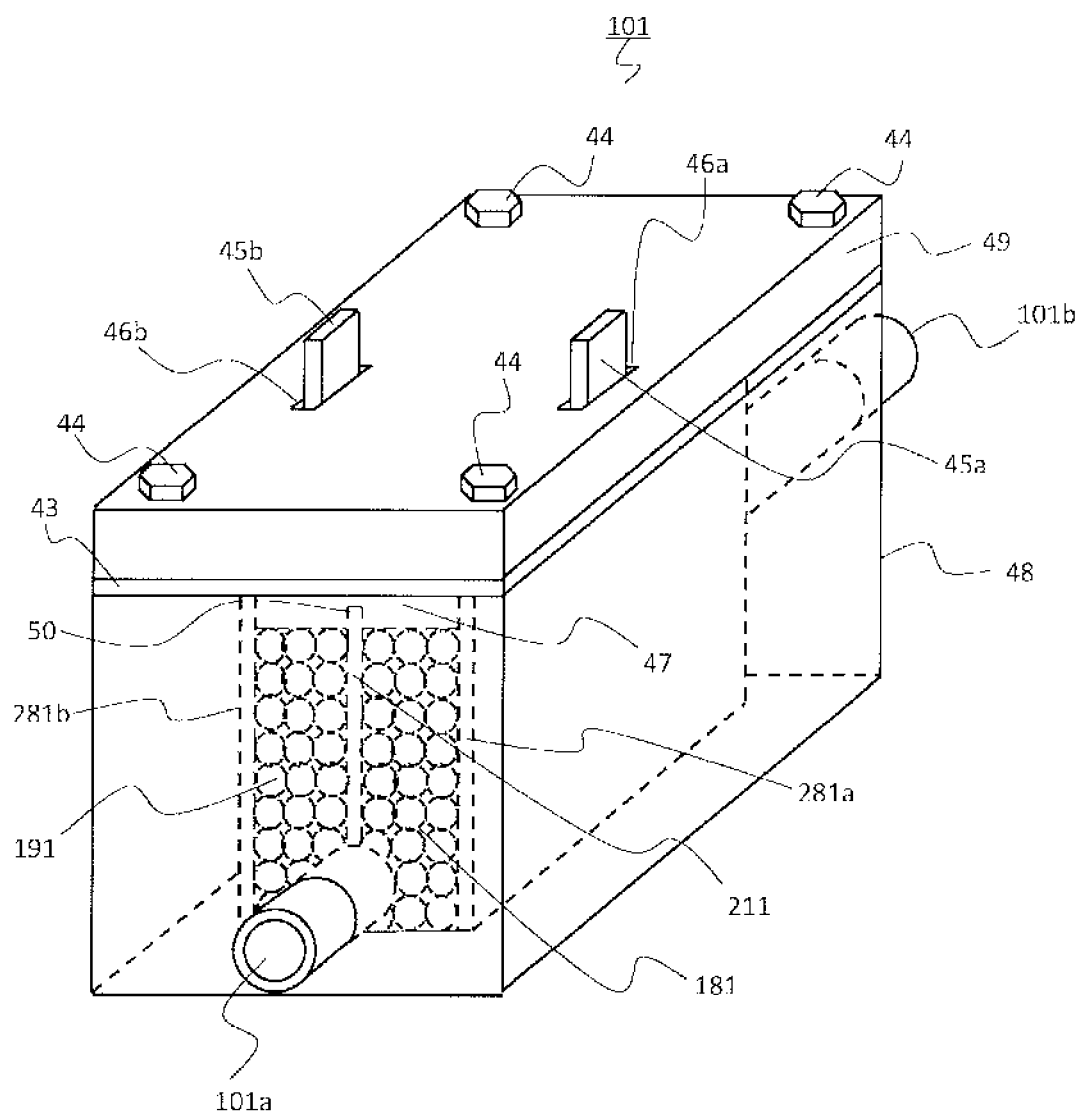
FIG. 13 is a perspective view showing a water treatment unit according to embodiment 16 of the present invention.
Figure 14:
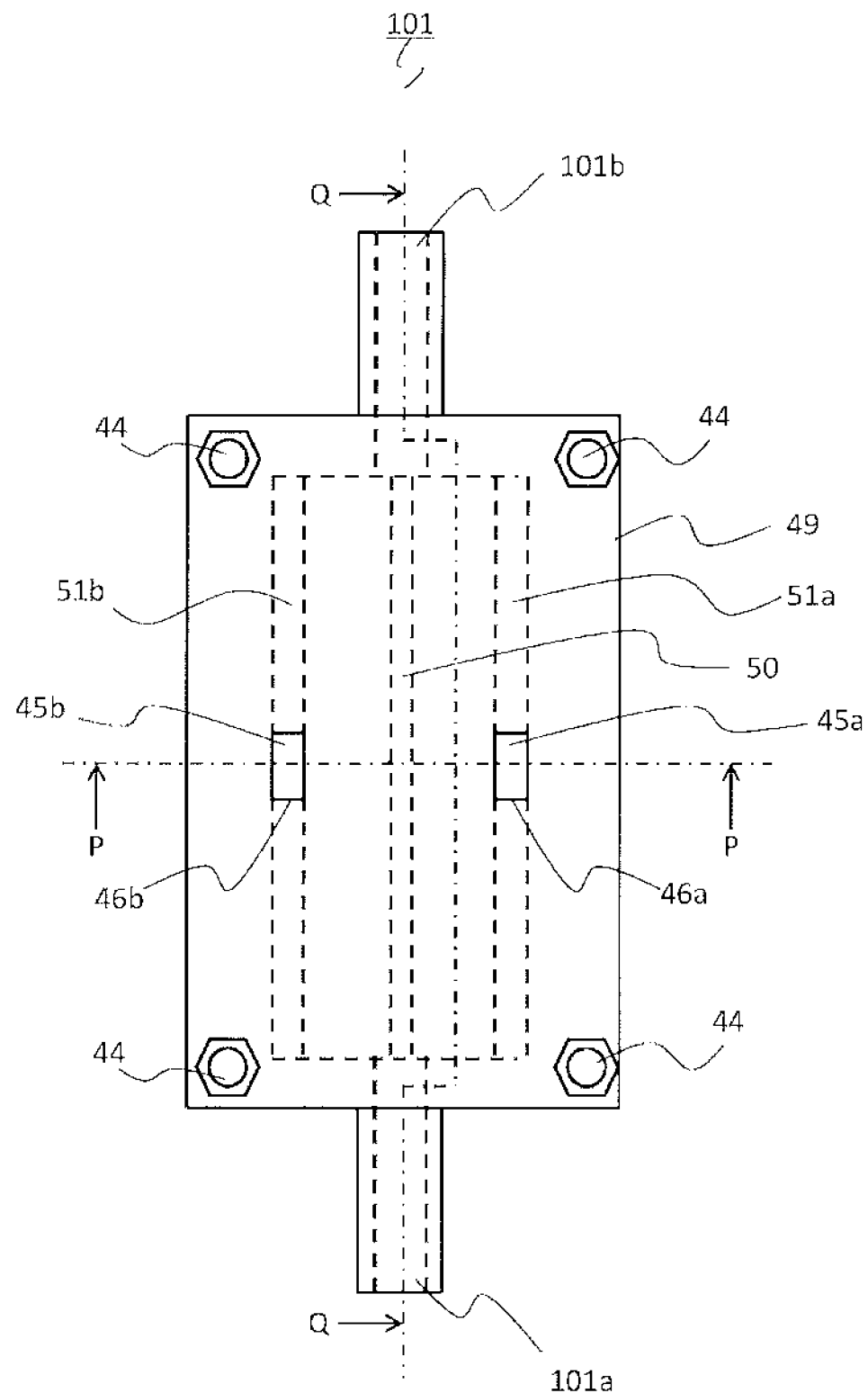
FIG. 14 is a top view showing the water treatment unit according to embodiment 16 of the present invention.
Figure 15:
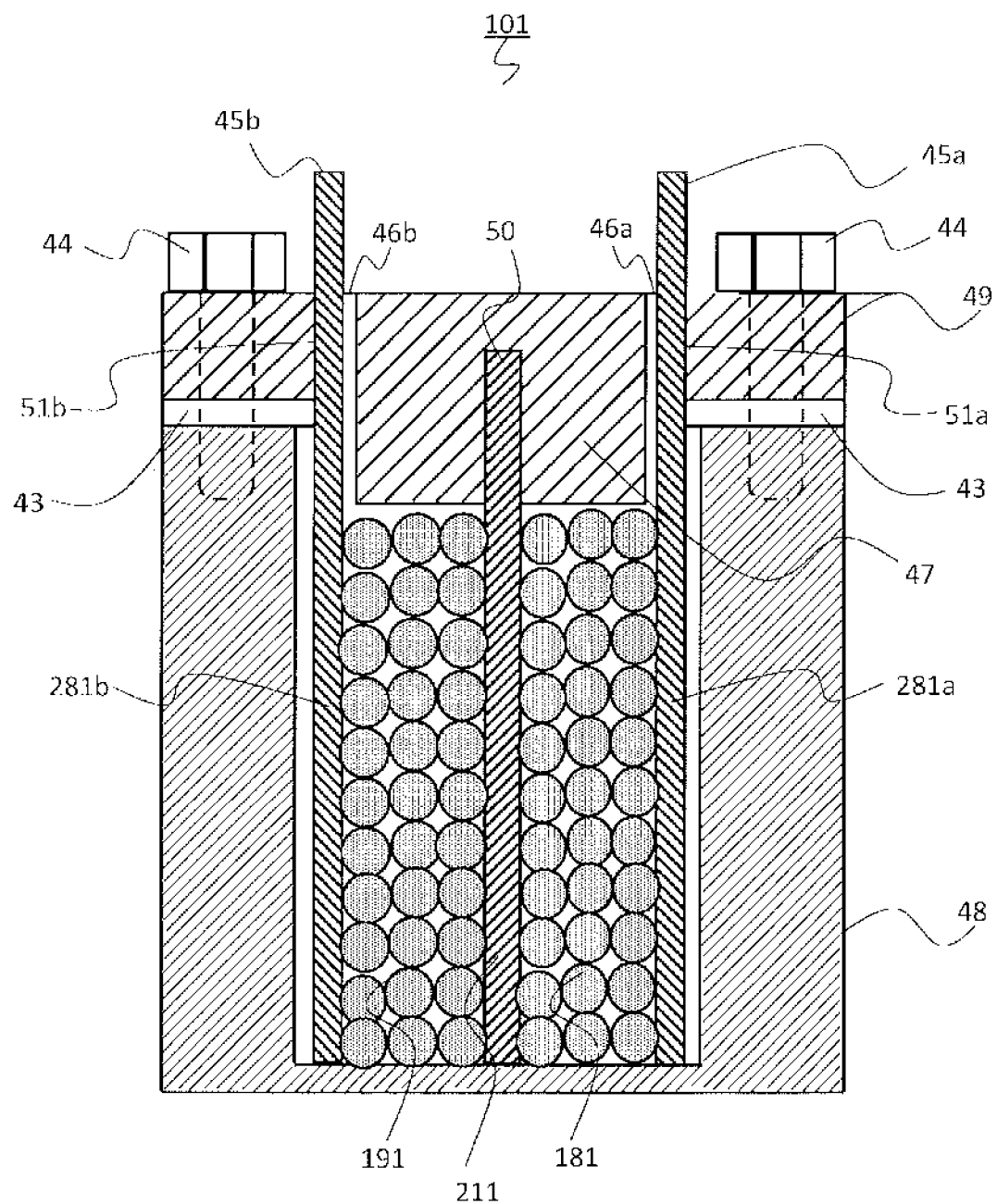
FIG. 15 is a sectional view along P-P line in FIG. 14.
Figure 16:
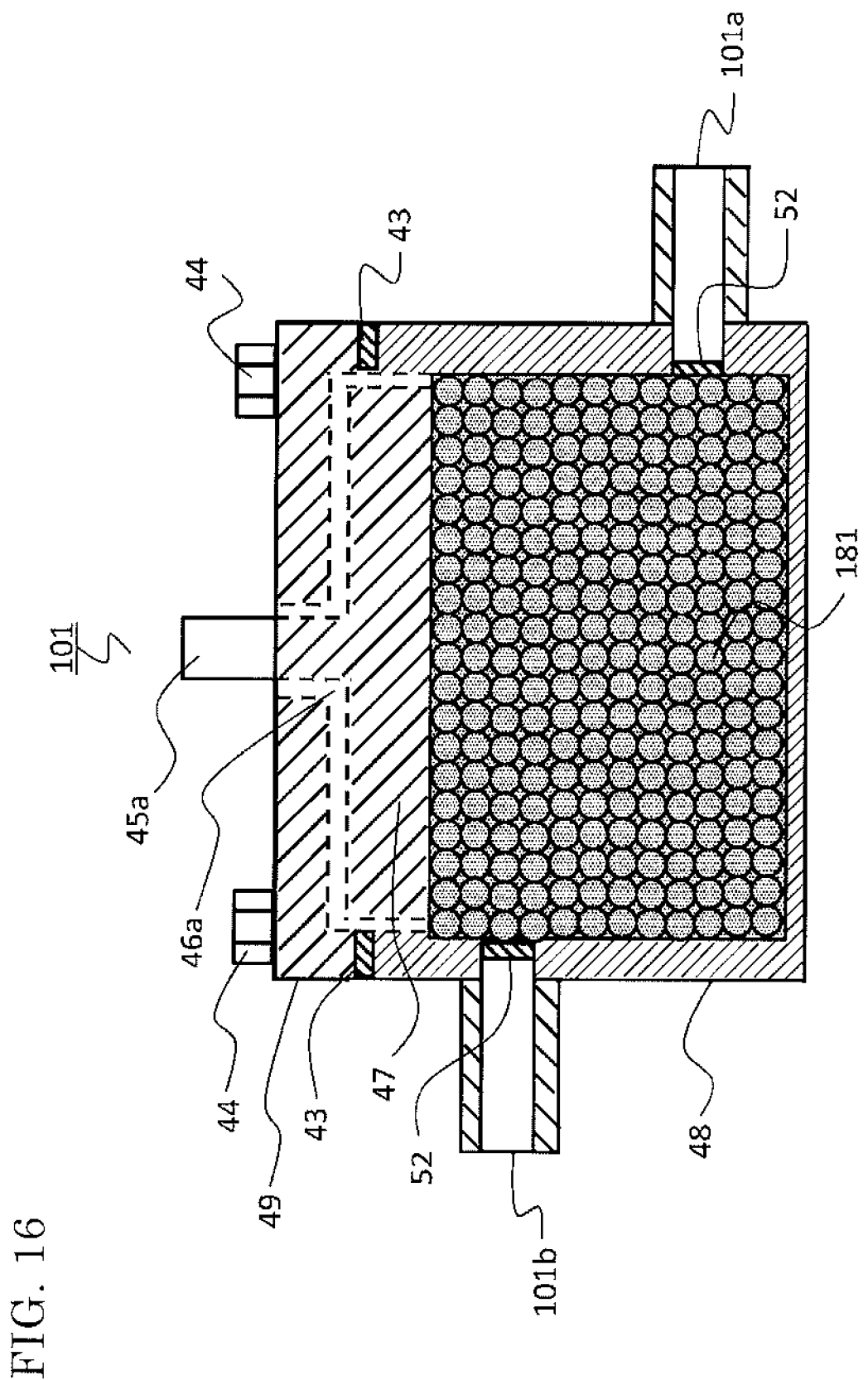
FIG. 16 is a sectional view along Q-Q line in FIG. 14.

Hereinafter, embodiment 16 of the present invention will be described with reference to FIGS. 13 to 16. In embodiment 16, a pressing portion for pressing the first granular electrode member and the second granular electrode member is provided to the water treatment unit described in any of embodiments 1 to 15. FIG. 13 is a perspective view showing the water treatment unit according to embodiment 16, FIG. 14 is a top view showing the water treatment unit according to embodiment 16, and FIG. 15 and FIG. 16 are sectional views along P-P line and Q-Q line in FIG. 14. As shown in FIG. 13, a water treatment unit 101 is configured such that a first granular electrode member 181, a second granular electrode member 191, a pair of collectors 281a, 281b, and a separator 211, which correspond to the first granular electrode member 18, the second granular electrode member 19, and the pair of collectors 28a, 28b, and the separator 21 described in the above embodiments 1 to 15, are stored in a treatment container 48. The treatment container 48 is, for example, a rectangular parallelepiped, and a plate-shaped lid 49 is placed above the upper surface of the treatment container 48 while a packing 43 formed from an elastic member is provided therebetween. The lid 49 has a predetermined thickness, and is fastened to the treatment container 48 by four screws 44 passing through-holes (not shown) formed at the four corners. Inside the treatment container 48, the pair of collectors 281a, 281b are placed with the separator 211 therebetween, and the first granular electrode member 181 and the second granular electrode member 191 are placed between the separator 211 and the pair of collectors 281a, 281b. In order to prevent short-circuit between the first granular electrode member 181 and the second granular electrode member 191, a resin material having an insulation property or metal having an electrically insulating coat is used as the materials of the treatment container 48 and the lid 49.

As shown in FIG. 13 and FIG. 14, the lower surface of the lid 49 has a pair of collector grooves 51a, 51b into which the upper ends of the pair of collectors 281a, 281b are inserted, and a separator groove 50 into which the upper end of the separator 211 is inserted. The pair of collectors 281a, 281b are positioned by their upper ends being fitted to the collector grooves 51a, 51b, and the separator 21 is positioned by its upper end being fitted to the separator groove 50.

The first granular electrode member 181 and the second granular electrode member 191 serve to adsorb ions in treatment target water when voltage is applied. The granular electrode members included in the first granular electrode member 181 and the second granular electrode member 191 in the present embodiment are not made into a sheet form or the like, and are provided in the treatment container 48 in a state in which the granules are not fixed to each other. That is, the first granular electrode member 181 and the second granular electrode member 191 are each configured to include a plurality of flowable granular electrode members. As the materials of the granular electrode members included in the first granular electrode member 181 and the second granular electrode member 191, a conductive material which has conductivity and a great specific surface area and has a great capacitance as a capacitor is used. For example, activated carbon, porous carbon, porous conductive beads, or porous metal is used. These conductive materials may be formed in a powder shape, a granular shape, or the like, and in the case of powder shape or granular shape, the outer diameter thereof is 50 nm to 10 mm.

The interval between the separator 211 and each collector 281a, 281b may be 1 to 100 times, or desirably, 5 to 20 times the outer diameter of the granular electrode members included in the first granular electrode member 181 and the second granular electrode member 191. If the interval between the separator 211 and each collector 281a, 281b is smaller than 1 times the outer diameter of the granular electrode members included in the first granular electrode member 181 and the second granular electrode member 191, the first granular electrode member 181 and the second granular electrode member 191 cannot be provided between the separator 211 and the collectors 281a, 281b. On the other hand, if the interval is greater than 100 times the outer diameter, the electric resistances of the entire first granular electrode member 181 and the entire second granular electrode member 191 are increased, so that desalination performance in the desalination step is reduced. This is because, as the thicknesses of the first granular electrode member 181 and the second granular electrode member 191 are increased, the number of granules of the granular electrode members included in each of them is increased, leading to formation of a large number of contact portions between granules, which have a great electric resistance due to contact resistance.

The pair of collectors 281a, 281b are for applying electricity to the first granular electrode member 181 and the second granular electrode member 191, and collecting electricity at the time of discharging. The pair of collectors 281a, 281b are formed from a conductive and flexible material. For example, the pair of collectors 281a, 281b are formed from a graphite sheet, GRAFOIL (registered trademark), conductive rubber, or a metal sheet/plate sandwiched between or coated with such materials. In addition, terminals 45a and 45b are respectively formed at the upper ends of the pair of collectors 281a, 281b. The terminals 45a and 45b protrude from a pair of through-holes 46a and 46b formed in the lid 49 so as to be exposed to outside, and are used for making electric connection between a power supply (not shown), and the pair of collectors 281a, 281b and the first granular electrode member 181 and the second granular electrode member 191. Thus, when electricity is applied to the terminals 45a and 45b, electricity is also applied to the first granular electrode member 181 and the second granular electrode member 191.

The separator 211 prevents short-circuit between the first granular electrode member 181 and the second granular electrode member 191, and is formed from a material such as filter paper, a porous film, nonwoven fabric, a foamed material, or the like which allows transmission of liquid but blocks a conductive material so as to make electric insulation.

An inlet port 101a of the water treatment unit 101 is provided at one side surface of the treatment container 48, and communicates between outside of the treatment container 48 and a space between the pair of collectors 281a, 281b, i.e., a space in which the first granular electrode member 181, the second granular electrode member 191, and the separator 211 are placed. Thus, the water treatment unit 101 allows treatment target water to be directly injected into the space in which the first granular electrode member 181, the second granular electrode member 191, and the separator 211 are placed. An outlet port 101b of the water treatment unit 101 is provided on another side surface of the treatment container 48, and communicates between outside of the treatment container 48 and a space between the pair of collectors 281a, 281b. Thus, the water treatment unit 101 allows treatment target water to be directly discharged from the space in which the first granular electrode member 181, the second granular electrode member 191, and the separator 211 are placed. The inlet port 101a and the outlet port 101b are formed from a resin material having insulation property, such as acrylic resin, or metal having an electrically insulating coat, such as fluorine-coated stainless steel, in order to prevent short-circuit between the first granular electrode member 181 and the second granular electrode member 191.

At the end of the inlet port 101a on the inner side of the treatment container 48 and the end of the outlet port 101b on the inner side of the treatment container 48, as shown in FIG. 16, flow-out preventing members 52 are attached for preventing conductive materials constituting the first granular electrode member 181 and the second granular electrode member 191 from flowing out from the treatment container 48. The flow-out preventing members 52 are formed by a resin net having an insulating property or a metal mesh having an insulating coat, for example. In embodiment 16, the inlet port 101a is located at the lower part of the side surface of the treatment container 48, and the outlet port 101b is located at the upper part of the side surface of the treatment container 48. However, the locations of the inlet port 101a and the outlet port 101b are not limited thereto. For example, the inlet port 101a may be located at the upper part of the side surface of the treatment container 48 and the outlet port 101b may be located at the lower part of the side surface of the treatment container 48. Alternatively, both or one of the inlet port 101a and the outlet port 101b may be located near the center of the side surface of the treatment container 48. Still alternatively, they may be located at the lid 49.

At the lid 49, a pressing portion 47 is formed above the first granular electrode member 181 and the second granular electrode member 191 as shown in FIGS. 13, 15, and 16. The pressing portion 47 is formed in a projection shape so as to protrude toward inside of the treatment container 48, and has a lower surface formed in a flat shape so that a pressing force can be applied uniformly to the first granular electrode member 181 and the second granular electrode member 191. The size of the pressing portion 47 is designed so that the first granular electrode member 181 and the second granular electrode member 191 come into a predetermined pressed state when the screws 44 are screwed to the end.

Next, operation will be described. As the four screws 44 are screwed into the screw holes of the treatment container 48, the pressing portion 47 gradually presses the first granular electrode member 181 and the second granular electrode member 191 in the treatment container 48 from above, and when the screws 44 are screwed to the end, the first granular electrode member 181 and the second granular electrode member 191 are brought into a predetermined pressed state. In this way, the water treatment unit 101 brings the first granular electrode member 181 and the second granular electrode member 191 into a predetermined pressed state by the lid 49 of the treatment container 48, and keeps the pressed state of the first granular electrode member 181 and the second granular electrode member 191 by the fastening force of the screws 44 during a period in which the treatment target water is treated in the treatment container 48 in the desalination step. In the pressed state, the granules of the conductive materials constituting the first granular electrode member 181 and the second granular electrode member 191 are fixed and thus no longer flow. However, as described above, the granules of the first granular electrode member 181 and the second granular electrode member 191 are not fixed to each other and therefore can flow in a non-pressed state such as a state before the pressing and a state after cancelation of the pressing.

Here, the pressed state by the pressing portion 47 will be described. The pressed state by the pressing portion 47 is prescribed by a compression rate P defined as P=B/A. In this definition, A is the volume of the first granular electrode member 181 and the second granular electrode member 191 before the lid 49 is attached to the treatment container 48, and B is the volume of the first granular electrode member 181 and the second granular electrode member 191 when the lid 49 is attached to the treatment container 48 and the screws 44 are screwed to the end. In the case where the horizontal sectional area of the first granular electrode member 181 and the second granular electrode member 191 is constant between before and after pressing, the compression rate P is equal to the ratio between a height H1 of the lid 49 when the lid 49 is merely placed on the first granular electrode member 181 and the second granular electrode member 191 and the screws 44 are not screwed at all, and a height H2 of the lid 49 after the screws 44 are screwed to the end. In the present embodiment, the first granular electrode member 181 and the second granular electrode member 191 are placed between the collector 281a and the separator 211 and between the collector 281b and the separator 211, and the pair of collectors 281a, 281b and the separator 211 are positioned by the collector grooves 51a, 51b and the separator groove 50. Therefore, it can be said that the horizontal sectional area of the first granular electrode member 181 and the second granular electrode member 191 is constant between before and after pressing, and thus the compression rate P can be considered to be equal to the ratio between the height H1 of the lid 49 when the lid 49 is merely placed on the first granular electrode member 181 and the second granular electrode member 191 and the screws 44 are not screwed at all, and the height H2 of the lid 49 after the screws 44 are screwed to the end, i.e., P=H2/H1.

In the case where the treatment container 48 is transparent and thus the inside of the treatment container 48 is visible, the values of A and B can be acquired by actually measuring the dimensions of the first granular electrode member 181 and the second granular electrode member 191, and the compression rate P can be calculated from the acquired values of A and B. In the case where the treatment container 48 is not transparent and the inside of the treatment container 48 is not visible, the compression rate P is calculated from the height H1 of the lid 49 when the lid 49 is merely placed on the first granular electrode member 181 and the second granular electrode member 191 and the screws 44 are not screwed at all, and the height H2 of the lid 49 after the screws 44 are screwed to the end.

The compression rate P is prescribed in a range of 0.5 to 0.99, or desirably, 0.7 to 0.95. If the compression rate P is greater than 0.99, the contact area between the conductive materials constituting the first granular electrode member 181 and the second granular electrode member 191 decreases and the electric resistance increases, and this is not preferable. If the compression rate P is smaller than 0.5, the conductive materials are crushed and flow out from the treatment container 48 together with treatment target water, and this is not preferable.

The pressed state of the first granular electrode member 181 and the second granular electrode member 191 may be prescribed by the value of the electric resistance between the pair of collectors 281*a*, 281*b* or the value of pressure loss when treatment target water is passed in the desalination step. Alternatively, the pressed state may be prescribed by both values of the electric resistance and pressure loss.

In the case of prescribing the pressed state by the value of electric resistance, a value in a range of 0.01 to 100Ω, or desirably, 0.05 to 50Ω is used. Since the conductive materials constituting the separator 211, the first granular electrode member 181, and the second granular electrode member 191 have a resistance, the value of electric resistance cannot be made smaller than 0.01Ω. On the other hand, in the case of being greater than 100Ω, desalination performance is deteriorated, and this is not preferable.

In the case of prescribing the pressed state by pressure loss, a value in a range of 0.001 to 1000 kPa/m, or desirably, 0.05 to 500 kPa/m is used. Since the conductive materials constituting the first granular electrode member 181 and the second granular electrode member 191 have a water passing resistance, the pressure loss cannot be made smaller than 0.001 kPa/m. On the other hand, in the case of being greater than 1000 kPa/m, energy consumption relevant to water injection into the water treatment unit 101 increases, and this is not preferable.

If the pressed state by the pressing portion 47 is prescribed in an appropriate range as described above, the gaps in the conductive materials constituting the first granular electrode member 181 and the second granular electrode member 191 are finely divided, and flow of treatment target water into the gaps is also finely divided. Thus, the distance between ions in the treatment target water and the conductive materials constituting the first granular electrode member 181 and the second granular electrode member 191 is shortened, whereby adsorption of the ions to the first granular electrode member and the second granular electrode member is promoted. In addition, owing to the fine division, the flow of the treatment target water has a uniform thickness in the first granular electrode member 181 and the second granular electrode member 191. In addition, the contact area between the conductive materials constituting the first granular electrode member 181 and the second granular electrode member 191 increases, and the electric resistance decreases.

In embodiment 16, the same effects as in embodiment 1 can be obtained.

In addition, the water treatment unit is configured such that the pair of collectors are placed with the separator therebetween in the treatment container, the first granular electrode member and the second granular electrode member are placed between the separator and the pair of collectors, and the pressing portion for pressing the first granular electrode member and the second granular electrode member and keeping the pressed state is formed at the lid of the treatment container. Thus, the first granular electrode member and the second granular electrode member are formed by only conductive materials without using an additive such as a binder. Therefore, in the desalination step, the pores and the gaps in the conductive materials constituting the first granular electrode member and the second granular electrode member can be prevented from being occluded, and pressure loss due to injection of treatment target water can be decreased.

By keeping the pressed state of the first granular electrode member and the second granular electrode member, the gaps in the conductive materials constituting the first granular electrode member and the second granular electrode member are finely divided, and therefore flow of treatment target water into the gaps is also finely divided, whereby the distance between the ions in the treatment target water and the conductive materials is shortened, and thus adsorption of ions to the first granular electrode member and the second granular electrode member is promoted. Further, owing to the fine division of the water flow, flow of treatment target water in the first granular electrode member and the second granular electrode member has a uniform thickness, and therefore adsorption of ions is uniformly performed. Since promotion of ion adsorption and uniform ion adsorption are achieved, desalination performance can be further improved.

In addition, by keeping the pressed state of the first granular electrode member and the second granular electrode member, the electric resistance of the first granular electrode member and the second granular electrode member is reduced, and therefore applied electricity can be passed throughout the first granular electrode member and the second granular electrode member, and the pores in the conductive materials constituting the first granular electrode member and the second granular electrode member can be used without waste.

In addition, the treatment container is provided with the inlet port communicating between outside of the treatment container and the space in which the first granular electrode member, the second granular electrode member, and the separator are placed, so that the treatment target water directly flows into the first granular electrode member, the second granular electrode member, and the separator. Therefore, the treatment target water can spread over the entirety of the separator, the first granular electrode member, and the second granular electrode member.

In embodiment 16, the pressing portion is formed at the lid of the treatment container. However, without limitation thereto, for example, the lid and the pressing portion may be separate members. In this case, only the pressing portion may be fastened by screws, and the lid may be fixed to the treatment container by another fixation member. In embodiment 16, the separator groove and the pair of collector grooves are formed on the lid. However, without limitation thereto, for example, the separator groove and the pair of collector grooves may be formed in the treatment container, or may be formed for both of the lid and the treatment container.

Embodiment 17

Figure 17:
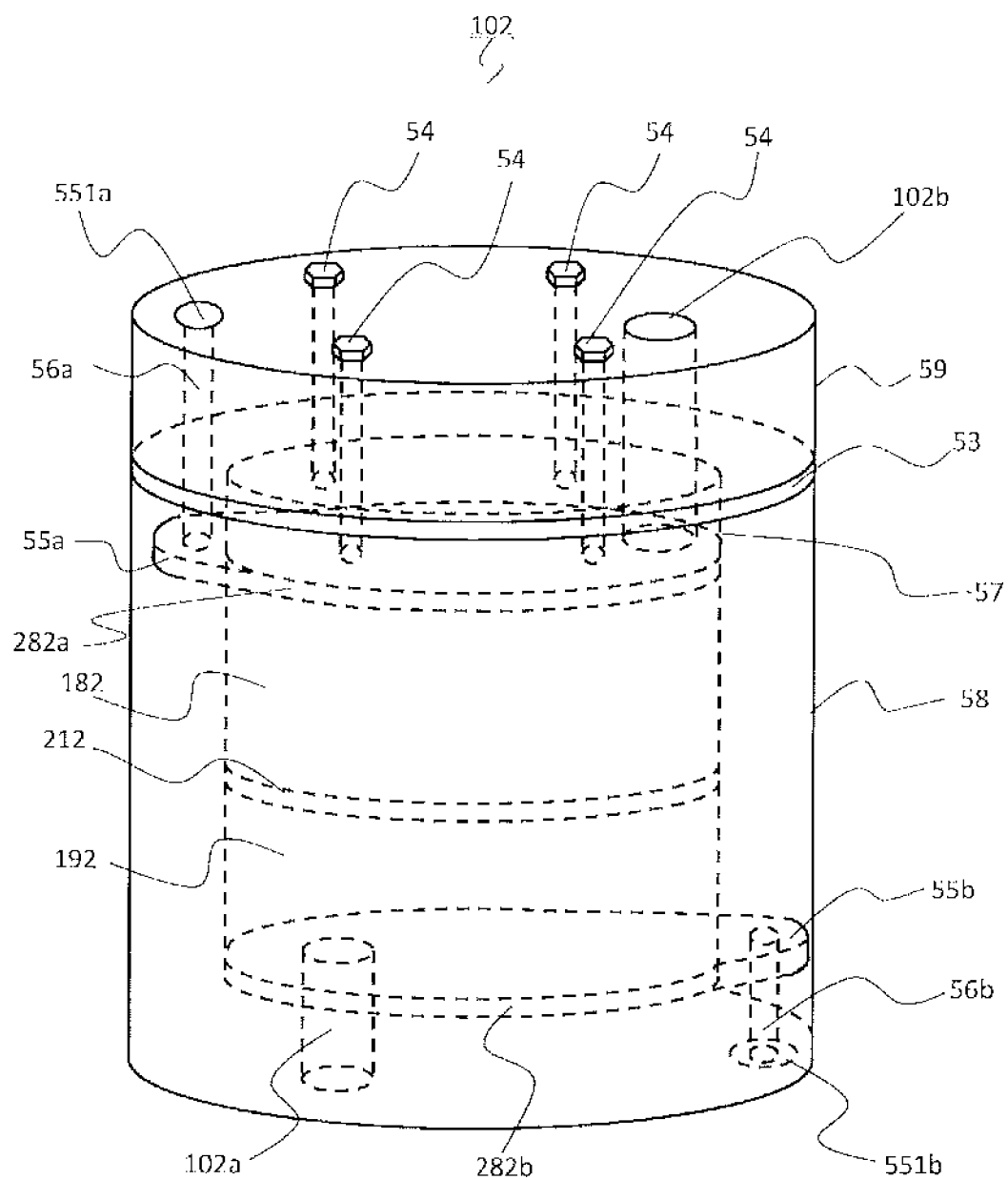
FIG. 17 is a perspective view showing a water treatment unit according to embodiment 17 of the present invention.

Hereinafter, embodiment 17 of the present invention will be described with reference to FIG. 17. Embodiment 17 relates to a configuration in which, in the water treatment unit described in any of embodiments 1 to 15, a pressing portion for pressing the first granular electrode member and the second granular electrode member is provided to the water treatment unit, and the pair of collectors and the separator are arranged in the vertical direction. FIG. 17 is a perspective view showing a water treatment unit 102 according to embodiment 17 of the present invention. As shown in FIG. 17, a water treatment unit 102 is configured such that a first granular electrode member 182, a second granular electrode member 192, a pair of collectors 282*a*, 282*b*, and a separator 212, which correspond to the first granular electrode member 18, the second granular electrode member 19, the pair of collectors 28*a*, 28*b*, and the separator 21 described in the above embodiments 1 to 15, are stored in a cylindrical treatment container 58. A cylindrical lid 59 is placed above the upper surface of the treatment container 58 while a packing 53 formed from an elastic member is provided therebetween. The lid 59 has a predetermined height, and is fastened to the treatment container 58 by four screws 54 passing through-holes (not shown). The treatment container 48 is provided with an inlet port 102a through which treatment target water flows into the treatment container 48 from outside, and the lid 49 is provided with an outlet port 102b through which treatment target water flows to outside from inside of the treatment container 48.

Inside the treatment container 58, the pair of collectors 282a, 282b are placed with the disk-shaped separator 212 therebetween, and the cylindrical first granular electrode member 182 and the cylindrical second granular electrode member 192 are placed between the separator 212 and the collectors 282a, 282b. The pair of collectors 282a, 282b are formed in a disk shape, and have terminals 55a, 55b protruding on the side surfaces thereof. The first granular electrode member 182 and the second granular electrode member 192 are not made into a sheet form or the like, and are provided in the treatment container 48 in a state in which the granules are not fixed to each other. That is, the first granular electrode member 182 and the second granular electrode member 192 are each configured to include a plurality of flowable granular electrode members. The thicknesses of the first granular electrode member 182 and the second granular electrode member 192 are not prescribed, and the thicknesses of the first granular electrode member 182 and the second granular electrode member 192 can be changed by change of the amount of the conductive materials, whereby desalination performance can be adjusted.

A pressing portion 57 which comes into contact with the upper surface of the collector 282a is formed at the lid 59. The pressing portion 57 presses the first granular electrode member 182 and the second granular electrode member 192 via the collector 282a, by the lid 59 being fastened to the treatment container 58 by the four screws 54. In a pressed state, the granules of the first granular electrode member 182 and the second granular electrode member 192 are fixed and thus no longer flow. However, as described above, the granules of the first granular electrode member 182 and the second granular electrode member 192 are not fixed to each other and therefore can flow in a non-pressed state such as a state before the pressing and a state after the pressing is canceled.

One end of a terminal bar 56a provided so as to penetrate the lid 59 is connected to the terminal 55a protruding on the side surface of the collector 282a, and one end of a terminal bar 56b provided so as to penetrate the bottom surface of the treatment container 58 is connected to the terminal 55b protruding on the side surface of the collector 282b. Terminals 551a, 551b are formed at the other ends of the terminal bars 56a, 56b, respectively. In the desalination step, the terminal 551a is connected to the plus side of a power supply (not shown), and the terminal 551b is connected to the minus side of the power supply (not shown), whereby plus electricity and minus electricity are applied to the pair of collectors 282a, 282b, the first granular electrode member 182, and the second granular electrode member 192, and thus treatment target water is desalinated. As in embodiment 16, during the desalination step, the pressed state of the first granular electrode member 182 and the second granular electrode member 192 by the pressing portion 57 is kept.

In embodiment 17, the same effects as in embodiment 1 can be obtained.

In addition, the thicknesses of the first granular electrode member and the second granular electrode member can be changed by change of the amount of conductive materials, whereby desalination performance can be adjusted. Thus, adjustment of desalination performance can be easily performed.

In addition, by the pressing portion 57, the first granular electrode member and the second granular electrode member are pressed in a direction in which they are sandwiched between the pair of collectors. Therefore, the pair of collectors, and the first granular electrode member and the second granular electrode member, can be brought into close contact with each other, whereby the electric resistance during desalination can be decreased.

It is noted that, within the scope of the present invention, the above embodiments may be freely combined with each other, or each of the above embodiments may be modified or simplified as appropriate, whereby the present invention is applicable to water treatment for water purification, sewage, drainage, desalination, or the like. In addition, the present invention is also applicable to, for example, generation of sprinkling water, cooling water, production water, or washing water for air conditioners. Further, the present invention can be used in combination with a water heater, a dishwasher, a laundry machine, a cold/hot water system, an electric water heater, or a humidifier, and also, can be used as a water purifier. Besides the above devices, the present invention can be used in combination with a device that needs desalinated water, or can be mounted thereto.

DESCRIPTION OF THE REFERENCE CHARACTERS 1, 1A, 1B, 101, 102 water treatment unit
1e additive injection port
4, 4A, 4B washing water supply pump
14 control unit
16, 16a, 16b, 16c additive storage tank
17 reverse washing water tank
18, 18A, 18B, 181, 182 first granular electrode member
19, 19A, 19B, 191, 192 second granular electrode member
20 power supply unit
21, 21A, 21B, 211, 212 separator
27 additive generation unit
37 additive supply pump
38 additive injection portion
39 air pump
47, 57 pressing portion
100, 200, 300, 400, 500, 600, 700, 800, 900 water treatment apparatus

The invention claimed is:
1. A water treatment apparatus comprising:
a first electrode and a second electrode stored in a water treatment unit and provided so as to be separated from each other by a separator which has an electric insulation property and allows a liquid to pass therethrough;
a power supplier which is connected to a pair of collectors provided at both ends of the water treatment unit and applies voltage between the first electrode and the second electrode via the pair of collectors so that ions contained in treatment target water supplied from one side of the water treatment unit via an inlet port are adsorbed to the first electrode and the second electrode, thereby performing desalination and generating desalinated water; and
a washing water supply pump which causes washing water to flow from the other side of the water treatment unit to the one side of the water treatment unit, thereby washing the first electrode and the second electrode, wherein the first electrode and the second electrode each include a plurality of flowable granular electrode members, and the inlet port is provided with a flow-out preventing member at an end of the inlet port on an inner side of a container of the water treatment unit, for preventing the granular electrode members from flowing out from the water treatment unit, the flow-out preventing member including a metal mesh which is insulated at least at an exterior thereof using an insulating coat.

2. The water treatment apparatus according to claim 1, wherein the water treatment unit includes a pressing element for pressing the first electrode and the second electrode.

3. The water treatment apparatus according to claim 1, further comprising:
an additive supplier which supplies an additive to the washing water; and
a controller which determines whether or not to add the additive to the washing water.

4. The water treatment apparatus according to claim 3, further comprising a reverse washing water tank which stores the desalinated water as the washing water.

5. The water treatment apparatus according to claim 4, wherein
the additive supplier supplies the additive to the washing water stored in the reverse washing water tank.

6. The water treatment apparatus according to claim 5, wherein
the additive supplier is provided to a pipe connecting the water treatment unit and the washing water supply pump.

7. The water treatment apparatus according to claim 3, wherein
the additive supplier generates the additive and directly injects the additive through an additive injection port provided to the water treatment unit.

8. The water treatment apparatus according to claim 7, wherein
a plurality of additive injection ports are provided to the water treatment unit.

9. The water treatment apparatus according to claim 1, further comprising a circulation path through which the washing water flowing from the one side of the water treatment unit is sent to the other side of the water treatment unit.

10. The water treatment apparatus according to claim 1, wherein
the water treatment unit comprises a plurality of water treatment units connected in series and sharing a reverse washing water tank which stores the desalinated water as the washing water.

11. The water treatment apparatus according to claim 1, further comprising an air pump which injects air into the water treatment unit during washing of the first electrode and the second electrode.

12. The water treatment apparatus according to claim 1, comprising a first sensor connected to the inlet port which measures a conductivity of water flowing into or out of the water treatment unit via the inlet port.

13. The water treatment apparatus according to claim 12, comprising:
an exit port in the water treatment unit, and
a second sensor connected to the exit port which measures a conductivity of water exiting the warier treatment unit via the exit port.

14. The water treatment apparatus according to claim 13, comprising a controller which:
receives a first conductivity measurement from the first sensor of water entering the water treatment unit via the inlet port,
receives a second conductivity measurement from the second sensor,
compares the first and second conductivity measurements, and
determines whether to begin flow of the washing water based upon the comparison.

15. The water treatment apparatus according to claim 13, further comprising a controller which:
receives first and second conductivity measurements from the first and second sensors,
compares the first and second conductivity measurements,
controls the apparatus to begin flow of the washing water if a comparison value is above a predetermined range, and
controls the apparatus to begin flow of washing water having an additive if the comparison value is below the predetermined range.

16. The water treatment apparatus according to claim 12, wherein the first sensor measures a conductivity of washing water exiting the water treatment unit from the inlet port, the apparatus further comprising:
an exit port in the water treatment unit, and
a second sensor connected to the exit port which measures a conductivity of washing water entering the water treatment unit via the exit port.

17. The water treatment apparatus according to claim 16, comprising a controller which:
receives a conductivity measurement from each of the first and second sensors,
compares the conductivity measurements, and
determines whether to continue flow of the washing water based upon the comparison.

\* \* \* \* \*